United States Patent [19]

Pearlman et al.

[11] Patent Number: 5,801,362
[45] Date of Patent: Sep. 1, 1998

[54] PORTABLE ELECTRIC OVEN WITH FAN AND MOTOR ARRANGEMENT FOR IMPROVED HEATED AIR FLOW AND MOTOR COOLING

[75] Inventors: Theodore Pearlman, Holmdel; Wade Pearlman, Lincroft, both of N.J.

[73] Assignee: Hudson Standard Corporation, Newark, N.J.

[21] Appl. No.: 555,894

[22] Filed: Nov. 13, 1995

Related U.S. Application Data

[63] Continuation of Ser. No. 318,168, Oct. 5, 1994, abandoned, which is a continuation-in-part of Ser. No. 181,555, Jan. 14, 1994, abandoned.

[51] Int. Cl.$^6$ .................................. A47J 37/04; F27D 7/04
[52] U.S. Cl. ........................ 219/400; 126/21 A; 99/421 H; 99/474; 219/757
[58] Field of Search ........................... 219/400, 757; 126/21 A, 21 R; 99/474, 479, 476, 421 R, 421 H, 421 HV

[56] References Cited

U.S. PATENT DOCUMENTS

| | | | |
|---|---|---|---|
| 2,898,437 | 8/1959 | McFarland | 219/35 |
| 2,906,620 | 9/1959 | Jung | 99/1 |
| 2,957,067 | 10/1960 | Scafield | 219/35 |
| 2,969,450 | 1/1961 | Bernstein | 219/35 |
| 3,088,396 | 5/1963 | Proffitt | 99/443 |
| 3,194,149 | 7/1965 | Schibley | 99/421 |
| 3,333,531 | 8/1967 | Reuthen | 99/339 |
| 3,529,582 | 9/1970 | Hurko | 126/21 |
| 3,828,760 | 8/1974 | Farber et al. | 126/21 |
| 3,848,522 | 11/1974 | Genn et al. | 219/400 |
| 4,226,178 | 10/1980 | Geisler et al. | 99/447 |
| 4,295,034 | 10/1981 | Assmann | 219/400 |
| 4,327,279 | 4/1982 | Gulbert | 219/400 |
| 4,386,558 | 6/1983 | Holman et al. | 99/386 |
| 4,396,817 | 8/1983 | Eck et al. | 219/10.55 M |
| 4,415,799 | 11/1983 | Tanaka et al. | 219/400 |
| 4,508,947 | 4/1985 | Eke | 210/10.55 |
| 4,535,226 | 8/1985 | Logel et al. | 219/400 |
| 4,561,348 | 12/1985 | Haltus et al. | 99/421 |
| 4,810,856 | 3/1989 | Govanovic | 219/401 |
| 4,865,864 | 9/1989 | Rijswijck | 426/520 |
| 4,870,254 | 9/1989 | Arabori et al. | 219/400 |
| 4,870,255 | 9/1989 | Fiyü et al. | 219/400 |
| 5,045,671 | 9/1991 | Kanaya et al. | 219/411 |
| 5,066,581 | 11/1991 | Darvin | 219/400 |
| 5,142,125 | 8/1992 | Fioroli et al. | 219/400 |
| 5,165,328 | 11/1992 | Erickson et al. | 99/330 |
| 5,239,917 | 8/1993 | Lutkie et al. | 99/443 |

FOREIGN PATENT DOCUMENTS 2105459  3/1983  United Kingdom .

*Primary Examiner*—Philip H. Leung
*Attorney, Agent, or Firm*—Roylance, Abrams, Berdo & Goodman

[57] ABSTRACT

An electrically heated convection oven with built-in rotisserie for rotisserie roasting, baking, broiling, defrosting, and dehydrating foodstuff is characterized by the use of two motors. One for operating a fan which rotates within the heating chamber to create high velocity air flow throughout the heating chamber; the second one for rotating the rotisserie spit. The second motor is also utilized to drive a cooling fan that draws air over electronic controls to keep them safely cool. The electronic controls comprise a microcomputer which is pre-programmed to recognize input from a user and to process information from an air temperature sensor in the oven. The heating chamber features generously radiused, interior surfaces which from an integral, parabolic, reflective surface with substantial width for enhancing air flow, to increase air velocities and create evenness of heat within the heating chamber, thereby contributing to the performance of the oven.

23 Claims, 19 Drawing Sheets

PORTABLE ELECTRIC OVEN WITH FAN AND MOTOR ARRANGEMENT FOR IMPROVED HEATED AIR FLOW AND MOTOR COOLING

CROSS-REFERENCE TO RELATED APPLICATIONS

This application is a continuation of application Ser. No. 08/318,168, filed Oct. 5, 1994, now abandoned which is a continuation-in-part of application Ser. No. 08/181,555, filed Jan. 14, 1994 now abandoned.

FIELD OF THE INVENTION

The present invention relates to a convection oven which may be programmed to heat foodstuff in one of many heating or cooking modes which include broiling, baking, grilling, rotisserie roasting, defrosting and dehydrating.

BACKGROUND OF THE INVENTION

The present invention relates to an electrically heated oven for baking, broiling, grilling, rotisserie roasting, defrosting and dehydrating foodstuff.

A variety of electric cooking appliances are available on the market which employ one means or another to transfer heat from the electric heater to the food, each performing its intended function to a greater or lesser degree of success. Some of the more commonly available cooking appliances, their cooking modes, their relative merits and drawbacks are discussed below.

BAKING OVEN: A baking oven generally includes bottom and top heating elements which are partially or wholly concealed behind partition walls in order to prevent scorching of the food by radiant heat. The heating elements heat the partition walls which, on their part, heat the food by radiation and by the heated air. A baking oven is best suited for baking cakes, breads and the like, but not for most of the other above-mentioned tasks, e.g., grilling and rotisserie roasting. Another drawback of a baking oven is a long heat-up time or the time it takes the oven to reach a desired temperature. Finally, a baking oven is often characterized by an uneven distribution of heat, requiring the user to select the most suitable position for placing the food within the oven for uniform cooking and browning.

CONVECTION OVEN: A convection oven is similar to the aforementioned kind, in that it comprises heating elements, but it also comprises a fan or blower for circulating the air inside the oven space. The heating elements can be concealed behind partition walls if they are, for example, gas jets, or can be exposed electric heating elements. While the heat transfer from the heated air to the food is improved over conventional ovens, the drawbacks of slow heating and uneven heat distribution are not solved. Another drawback to a convection oven is the reduction of heat radiation from the walls which can be cooled by temperature gradients due to the pattern of air flow and relatively low velocity of the hot, circulating air.

An oven of this kind is described in U.S. Pat. No. 3,828,760 to Farber et al. The oven comprises a heating element at the top of the oven and a fan which is described in more detail below. The fan is situated above the heating element to blow hot air radiating therefrom downwards. This type of oven is disadvantageous because it does not create a rapid, circular air flow at a relatively constant rate. Thus, the cooking time is slower. Further, the foodstuff is cooked unevenly, with the top of the foodstuff cooking most rapidly. The top of the foodstuff is therefore more likely to be overcooked than the bottom portion of the foodstuff.

BROILING AND GRILLING APPLIANCE: This type of appliance and cooking mode is especially suited for preparing relatively thin cuts of meat and fish, resulting in the desired state of a broiled outer layer and a juicy, less-cooked interior.

ROTISSERIE OVEN: This type of appliance contains a rotating spit for roasting larger pieces of meat either by direct heat radiation or by hot air convection, resulting in a broiled outer layer and a softer interior.

DEFROSTER: This type of appliance exposes food to a slightly raised temperature for a considerable time. This appliance can be a convection oven set to low temperatures, or a special defrosting appliance.

DEHYDRATION APPLIANCE: Dehydration involves removal of moisture from fruit and vegetables, as well as from strips of marinated meat, for the purpose of preserving the food over extended time periods. As disclosed in U.S. Pat. No. 4,531,306 to Erickson, a food dehydrator comprises an enclosed dehydrating zone provided with superimposed shelves, means for moving a heated air stream through the zone and between the shelves, and a moisture sensing and controlling mechanism.

In the following, certain patents will be cited which disclose components and features related to those of the present heating appliance, but which suffer from certain drawbacks that are minimized, if not altogether avoided, by the present invention.

U.S. Pat. No. 3,828,760 to Farber et al. shows an oven that is suited for broiling, cooking, roasting, baking and defrosting. To achieve effective broiling, Farber positions the heating element along the upper wall of the cooking enclosure. To provide the air stream needed to circulate heated air, Farber places the blower in the center of the upper wall to move heated air downwardly in a cyclonic turbulent pattern within the cooking enclosure. The heated air meets at a vortex in the center, bottom portion of the enclosure and then moves upwardly while maintaining a cyclonic air stream pattern. This structure suffers at least two drawbacks. First, the proximity of the heater to the fan impedes the air flow resulting in a reduction of air velocity, and therefore less efficient heat transfer in the appliance and longer heat-up time than the present invention. Another drawback is the excessive heat that rises toward the fan motor, especially after the oven is turned off. Excessive heat causes the oil in the motor bearings to deteriorate more quickly.

U.S. Pat. No. 4,226,178 to Geissler et al., U.S. Pat. No. 4,295,034 to Assmann, and U.S. Pat. No. 4,535,226 to Logel et al., place the motor, circulation fan and heating element in the rear of the unit. In these cases, however, the heating element is not used to broil, but simply to heat the air. The heating element is located in close proximity to the fan, that is, around the fan, thus reducing heat transfer efficiency, as described above in connection with the Farber patent. Further, the fan and heating element in these hot air appliances are not located in the cooking chamber, but rather are placed in an adjacent chamber and separated by an apertured plate, or within the cooking chamber behind an apertured cover or shroud. In either case, heat transfer efficiency is less than if the coil and fan were exposed within the cooking chamber.

U.S. Pat. No. 5,165,328 to Erickson et al. described above achieves substantially unobstructed air flow emerging from the fan and therefore high air velocities (i.e., 1000 feet per minute (F.R.M.) to 4000 F.R.M.) by placing a heating element behind a blower to avoid the obstruction to air flow in the present invention. The blower and fan, however, are in a vertical arrangement, resulting in excessive heat rising toward the fan motor and lending to the deterioration of the fan motor.

U.S. Pat. No. 4,386,558 to Holman et al. and U.S. Pat. No. 2,898,437 to McFarlund each teach a convection oven in which the heating element and the fan are remotely located from each other. In both, however, the fans are located outside the cooking chamber and do not produce the high velocity air flow needed for high efficiency heat transfer.

The oven according to the present invention is designed to achieve most optimally all of the above cooking modes, which are typically carried out by different appliances, by suitably controlling the temperature and air circulation inside the appliance.

The present invention is advantageous because it provides a combination electric cooking appliance designed to utilize high-speed air flow for baking, grilling and broiling of food placed on grilles, as well as for rotisserie roasting of food on a spit. In addition, the appliance is electronically programmable for dehydrating fruit, vegetables and meats, and for defrosting by suitably controlling temperature and maintaining substantially constant and uniformly circulated air.

The present invention protects the electronic controls and electric motors from overheating and therefore ensures their longevity by cooling them using air circulation.

The manufacturing cost of the appliance is relatively low, and the appliance is smaller than most conventional ovens.

Additional objects and advantages of the present invention will become obvious to persons skilled in the art as the following descriptions proceed, and the features of novelty which characterize the invention will be pointed out in the claims annexed to and forming part of the specification.

SUMMARY OF THE INVENTION

In general terms, the claimed invention is a high-performance convection oven having enhanced air flow and accurate, uniform temperature control which comprises (1) a first motor preferably located in an outside-vented area behind the back wall of the oven; (2) a second motor preferably located in an outside-vented electronic housing located behind a side wall of the oven; (3) electric heating rods located inside the oven closely parallel to the top wall of the oven; and (4) electronic control means in the electronic housing comprising a programmable computer and a panel box with instruments (e.g., buttons and a dial) and a display that is designed so that the user can easily operate the oven as a convection oven, a rotisserie, a baking oven, a broiler, a dehydrator or a defroster.

The first motor is designed to operate (a) a fan located inside the heating chamber of the oven and closely parallel to the rear wall of the oven to circulate air over and around the heating elements and (b) a fan located in the area behind the back wall of the oven which cools the area in which the first motor is located. The second motor is designed (c) to operate a fan located in the vented electronic center area which fan cools the area in which it is located and (d) to rotate the spit of the rotisserie when desired. The interior surface of the heating chamber is generally parabolic in shape to enhance air circulation.

The electrically heated oven according to the present invention is adaptable for the processes of baking, broiling, grilling, rotisserie roasting, defrosting and dehydrating of different kinds of food by varying the temperature and timing of the specific process when necessary and by maintaining substantially constant and uniformly circulated air.

In accordance with an embodiment of the present invention, the oven comprises the following components:

a heating chamber surrounded by an outer housing including a front normally closed by a hinged door; a top wall spaced from the top wall of the housing to form a horizontal air duct; two side walls spaced, respectively, from the two side walls of the housing by two wide lateral compartments; a rear wall separated from the rear wall of the housing by another duct; and a bottom common to the chamber and the housing separated from a counter top or other surface by support legs;

an electric motor positioned in a motor housing attached to the rear wall with a long shaft penetrating into the chamber; a radial fan impeller attached to the shaft for rotating inside the chamber; a second fan impeller attached to the shaft and positioned within the air duct between the housing and chamber rear walls to circulate air for cooling the electric motor;

several parallel heating rods spanning the top portion of the chamber;

electronic controls positioned in one of the lateral compartments;

a second electric motor and a reduction gear positioned in the lateral compartment holding the electronic controls; a high-speed shaft connected to the second motor carrying a fan impeller inside this compartment to induct outside air over the electronic controls; a low-speed shaft connected to the second motor and extending into the chamber and having its end adapted for receiving a horizontally rotated rotisserie spit;

a bearing assembly in the side wall opposite the end of the low-speed shaft to support the other end of the spit; and a control panel mounted on the outside of the housing for operating the electronic controls with a view to select the different operations of the oven as discussed above.

The electronic controls sense the temperature of the air in the cooking area, operate each of the fans and processes the temperature information to control the heating rods so the user can program the oven accordingly.

The electronic controls preferably comprise a microcomputer programmed to follow the user's instructions regarding the different modes of treating the food, which are selected by pressing one or more of the buttons on the outside control panel and setting the required temperature and time period for appropriate ones of the heating or cooking modes. The panel preferably contains display screens adapted to verify the selected cooking mode, temperature and duration of the process. A thermistor sensor inside the oven provides the temperature inside the chamber to the electronic controls for suitable operation of the heating rods.

Additional features will be pointed out and described in the description of the accompanying drawings.

BRIEF DESCRIPTION OF THE DRAWINGS

The above features and advantages of the present invention will be more readily apparent from the following description when read in conjunction with the accompanying drawings, in which.

DETAILED DESCRIPTION OF THE INVENTION

Figure 1:
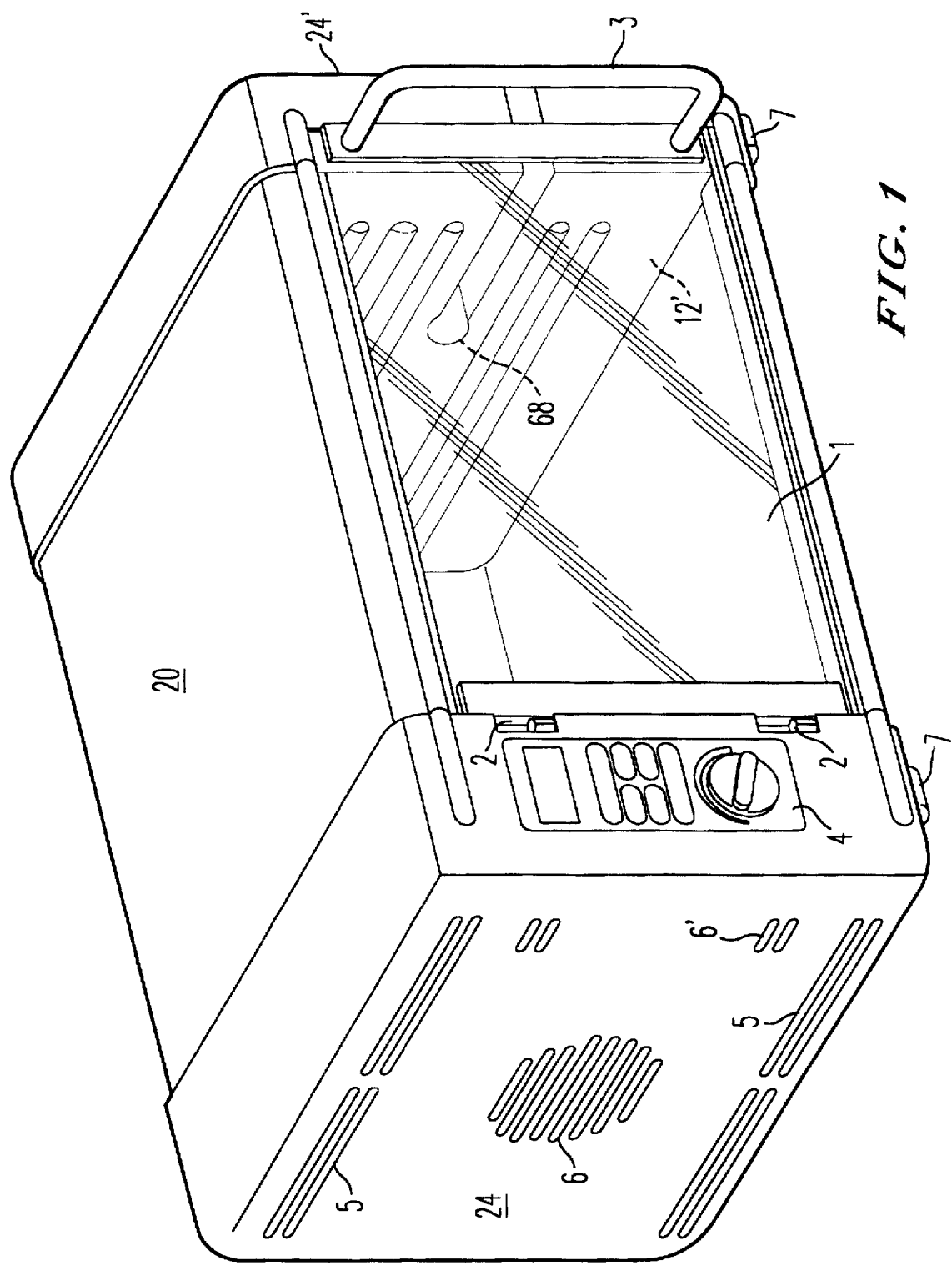
FIG. 1 is an isometric view of the electric cooking appliance according to the invention.

The isometric view of the appliance in FIG. 1 shows its outer housing comprising a front glass door 1 turnable about hinges 2 and a handle 3. FIG. 1 also shows the control panel 4, which is illustrated in detail in FIG. 6, and one side wall of the housing having air inlet slots 6,6' and air outlet slots 5. The slots 5, 6 and 6' are shown in section in FIGS. 3 and 4. Also visible in the drawing are the feet 7 supporting the unit and spacing it from a supporting surface such as a counter top. Finally, FIG. 1 shows part of the interior components which will be enumerated and described with reference to the following figures.

Figure 2:
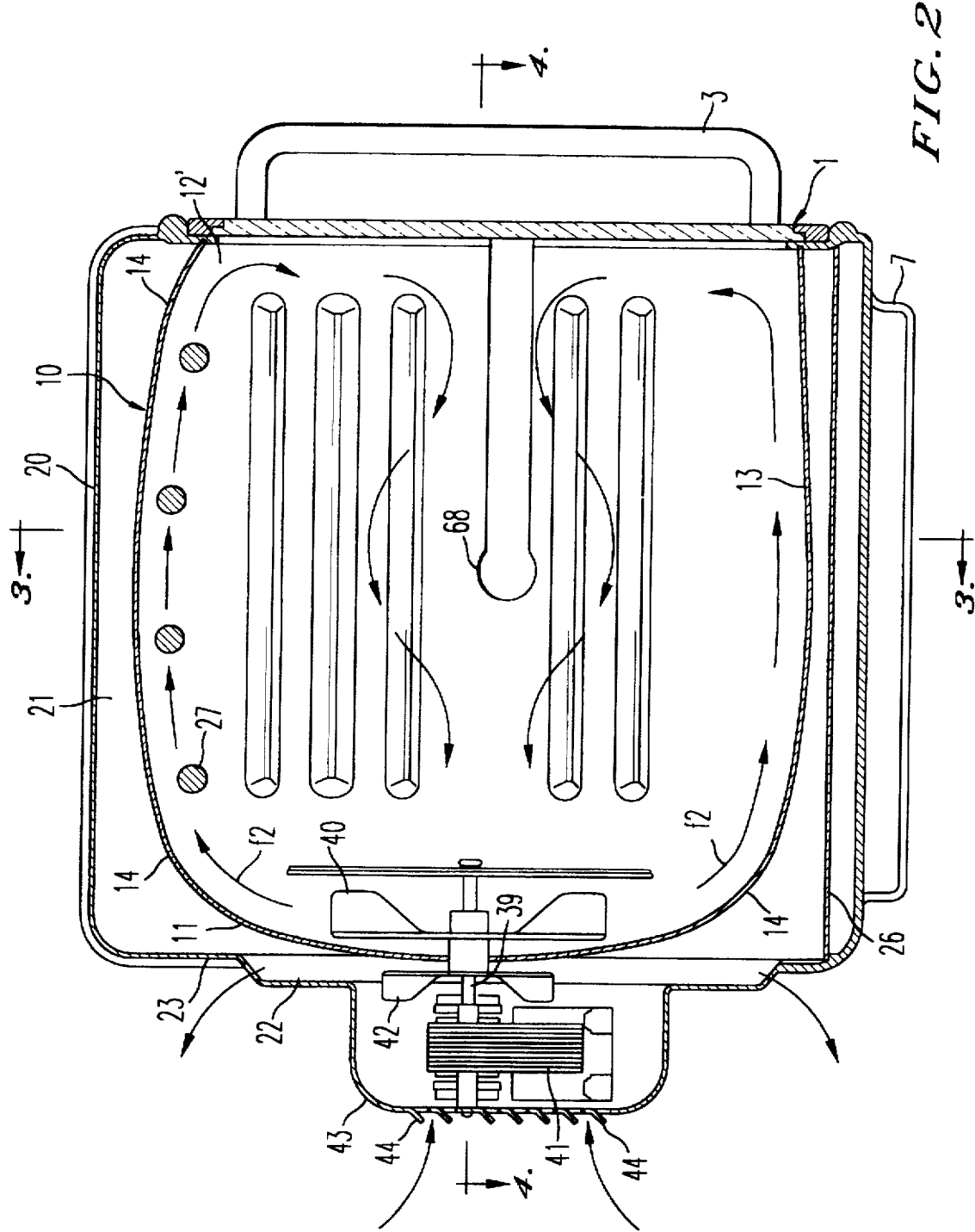
FIG. 2 is a cross sectional view of the appliance illustrated in FIG. 1, perpendicular to the front of the unit.
Figure 3:
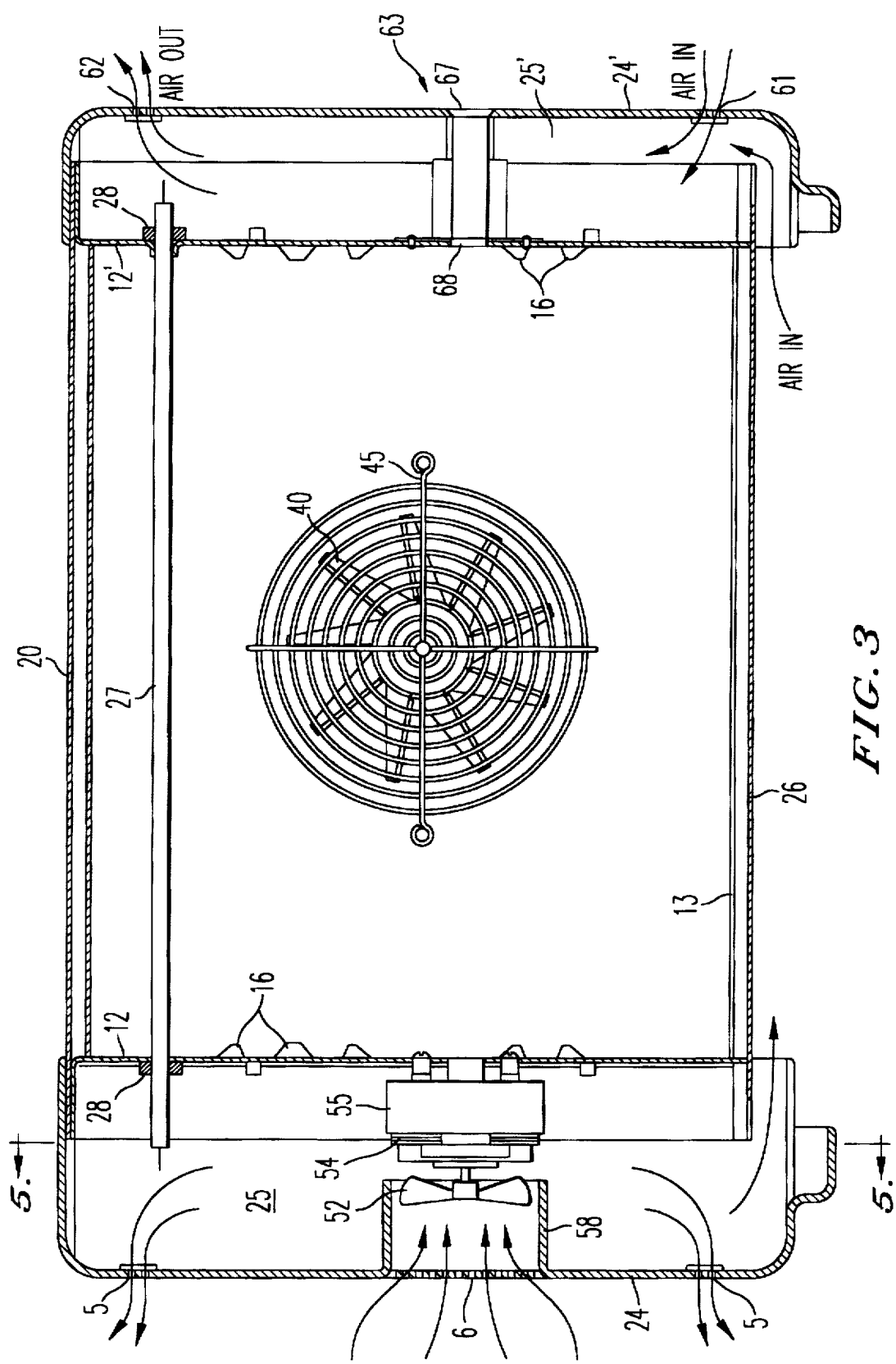
FIG. 3 is a cross section view of the appliance along line 3—3 of FIG. 2.
Figure 4:
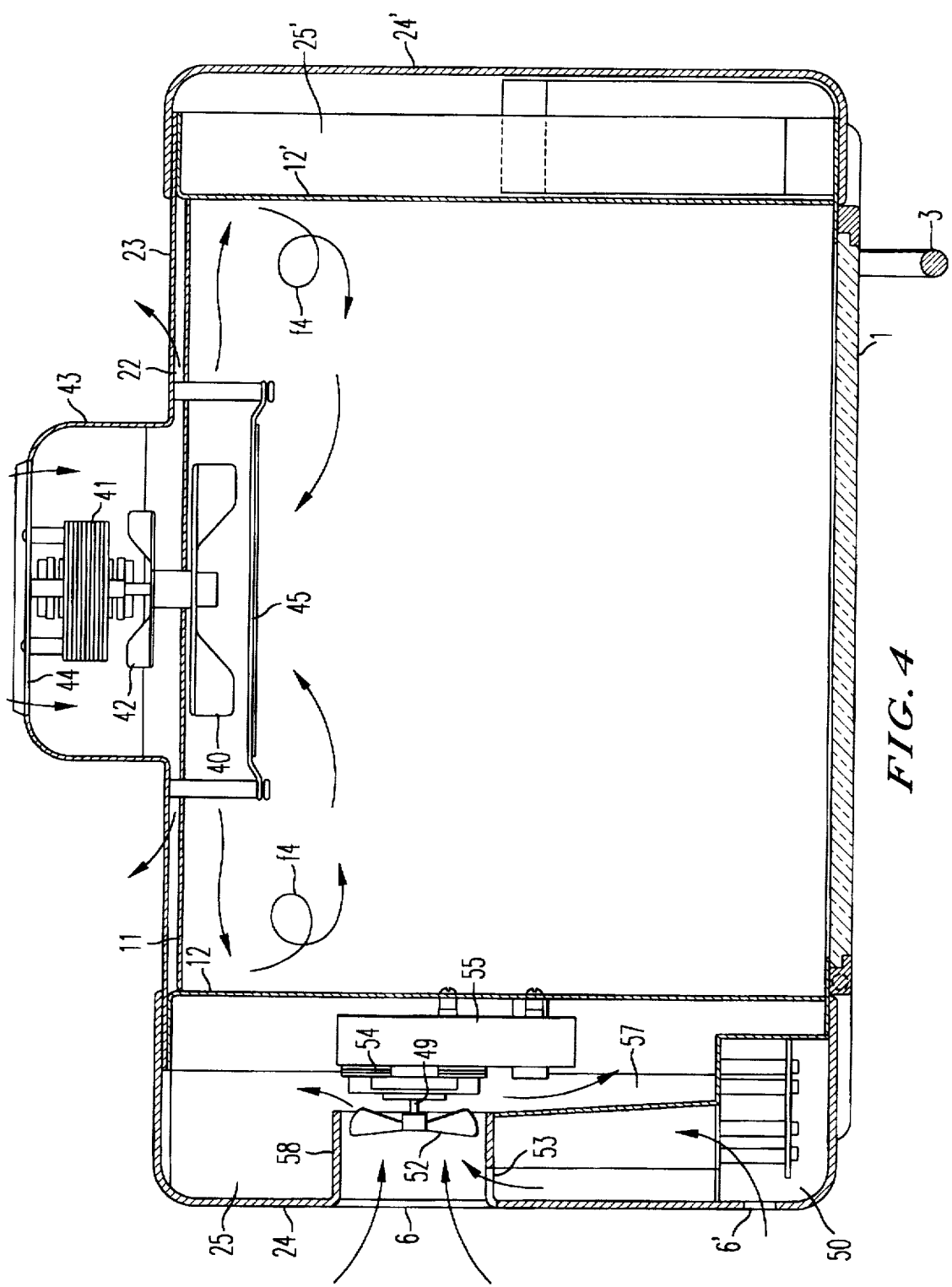
FIG. 4 is a horizontal section of the appliance along line 4—4 of FIG. 2.

The details of the heating chamber and its position inside the outer housing are illustrated in FIGS. 2, 3 and 4. The heating chamber includes a top wall 10, a rear wall 11, two side walls 12,12' and a bottom wall 13. In accordance with the invention, the manner in which the top and the bottom walls preferably merge with the rear wall, and the top wall merges with the front of the outer housing, forms a parabolically shaped, deflective surface indicated generally at 14 for enhancing air circulation. The radiuses and tolerances of the parabolic surface are such that the top, rear and bottom walls are generally curved and only a small area of these surfaces are actually flat. The parabolic surface is therefore distinguishable from conventional ovens with flat surfaces that meet in squared or rounded corners.

With continued reference to FIGS. 2, 3 and 4, the front portion of the bottom wall 13 is preferably straight and terminates in the front opening closed by the glass door 1. The side walls 12, 12' are provided with several inwardly protruding, horizontal ridges 16 which function as supports for trays or grilles at varying levels. The outer housing comprises a top 20 spaced apart from the heating chamber top wall 10 by an air duct 21. A rear wall 23 of the outer housing is spaced from the heating chamber rear wall 11 by an air duct 22. Two side walls 24, 24' are separated from the respective side walls 12 and 12' of the heating chamber by wide lateral compartments 25 and 25' respectively. The bottom 26 of the outer housing is adjacent the bottom wall 13 of the heating chamber. FIGS. 3 and 4 show that the side walls of the chamber meet the bottom and the top preferably in the form of sharp corners.

The chamber is heated by several rod-shaped heating elements 27 which extend across the entire breadth of the chamber and are supported in side walls 12,12' by insulating bodies 28. In the present invention, there are preferably four heating elements 27. Their connection to the power supply is not shown as it is conventional and well known to the art. The heated air is circulated inside the chamber to provide an even temperature throughout by means of a radial fan impeller 40, which is mounted on the elongated shaft 39 of an electric motor 41. The shaft 39 carries another, smaller fan impeller 42 behind the large impeller. The motor 41 and the impeller 42 are positioned in a cylindrical housing 43, which is attached to the rear wall 23 of the main housing and is provided with air inlet openings 44. The impeller 40 is rotated inside the chamber and close to the rear wall 11 to blow the hot air in a radial direction, as shown by arrows f2 (FIG. 2) and f4 (FIG. 4). The air flows close to the bottom and the top of the chamber due to the parabolic and deflective shape of the heating chamber, the top, rear and bottom walls of which are each gradually curved as described above. The air flow created by this parabolic shape provides evenness of heat. The air generally does not reach the side walls 12,12' as it is reflected by the sharp corners and returned to the center of the fan impeller. As shown in FIGS. 3 and 4, the fan is covered by a removable grille 45 to prevent contact by human hands, but allows cleaning after its removal. The smaller impeller 42 draws air into the housing 43 through the air inlets 44 to pass air along the motor walls and cool them. Air is radially exhausted by the impeller into the narrow air ducts 22, keeping the rear wall 23 cool.

Figure 5:
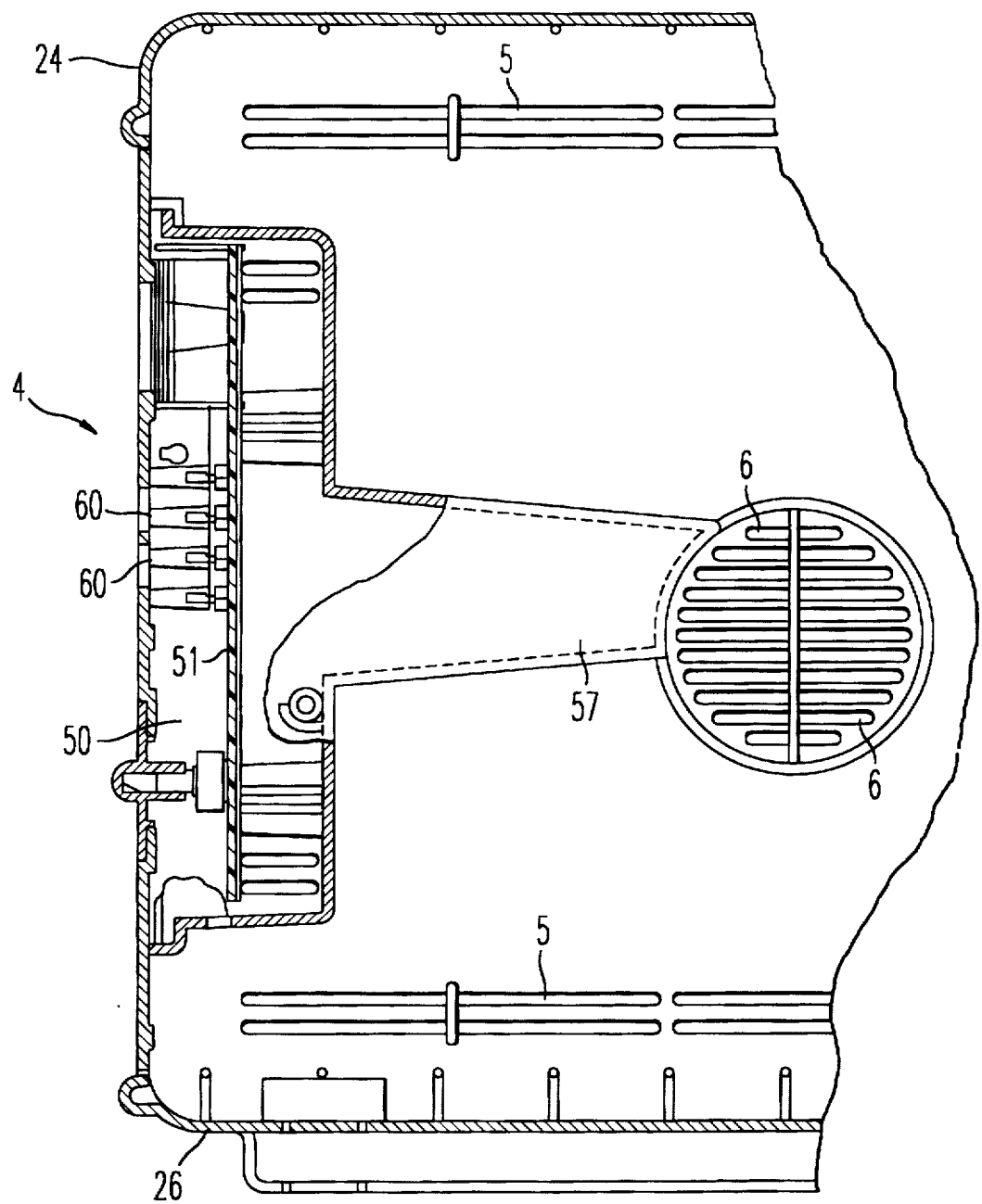
FIG. 5 is a side view of the appliance along line 5—5 of FIG. 3, with parts of the housing removed to illustrate the position of the electronic controls.
Figure 6:
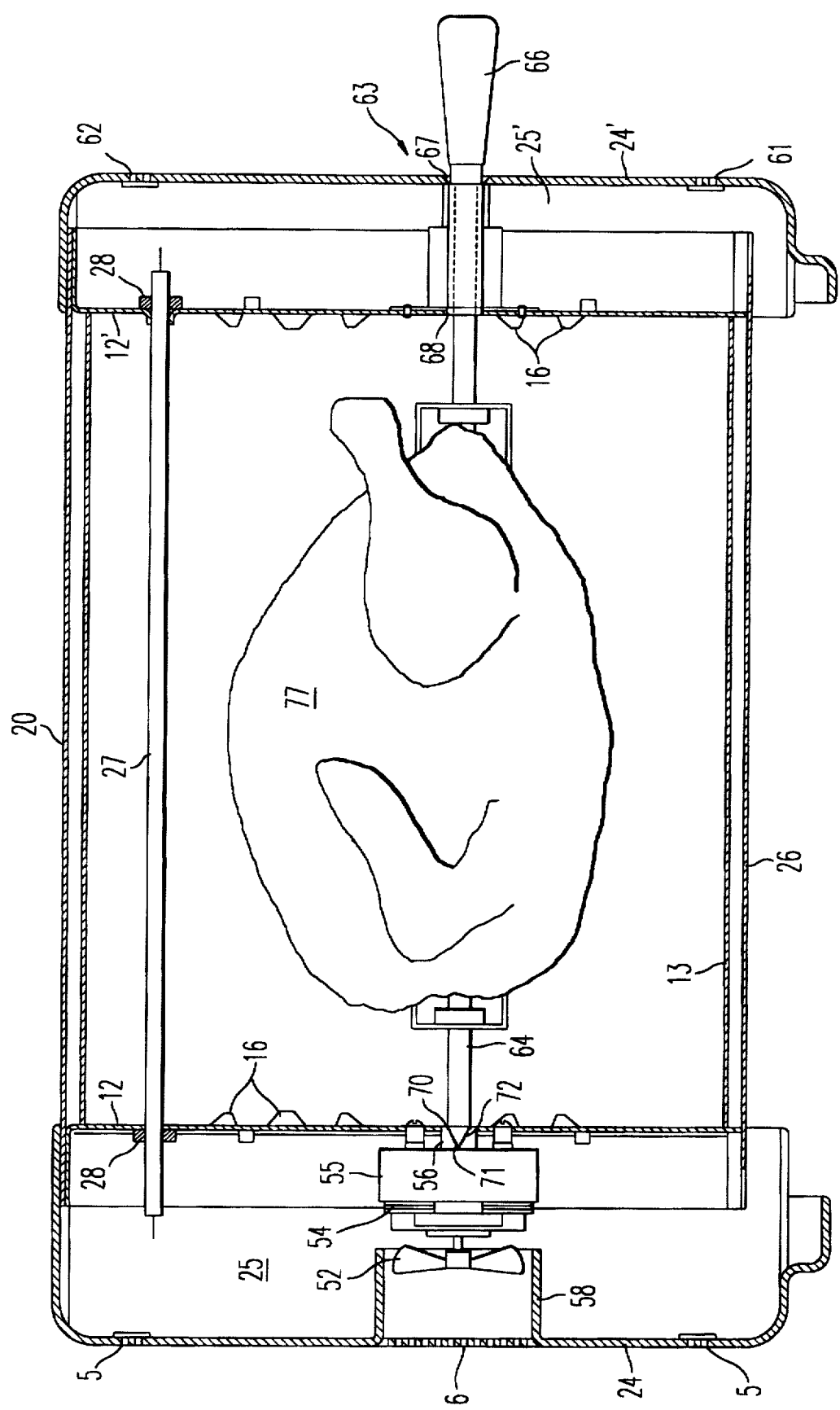
FIG. 6 is a cross sectional view of the appliance taken along line 3—3 of FIG. 2, showing a fowl being rotisserie roasted.

The left-hand compartment 25 between the respective side walls of housing and chamber, as shown in FIGS. 3, 4 and 5, encloses electric and electronic controls of the motors and heating elements, and the means for cooling them. The controls, which are preferably in the form of a printed circuit board 51, are positioned in a housing 50 placed behind the panel 4 (FIG. 12) and are operated by the buttons 60 and knob 62 on the panel. The housing 50 receives air from the outside through the slots 6, 6' and is connected to the plenum of a fan 52 by openings 53. The fan impeller 52 is mounted on the high-speed shaft 49 of an electric motor 54 which is fastened to side wall 12 and includes a reduction gear 55 driving a low-speed shaft 56 (FIG. 6). The shaft 56 is configured for attachment to and the rotation of a spit 64 (FIG. 6) in a conventional manner. For example, the end of the low-speed shaft can be provided with a slot 70 (FIG. 6) that is correspondingly shaped (e.g., comprises four inwardly sloping sides 71 which terminate at a point within the slot) and therefore adapted to detachably receive the end 65 (FIG. 7) of a spit having a rectangular, cross-sectional shape that tapers to a point at the end 65. The friction of the four tapered sides 72 of the end 65 against the respective four inwardly sloping sides 71 of the slot 70 is sufficient to turn the spit 64 when the low-speed shaft 56 rotates.

The fan 52 draws outside air into the compartment 25 through slots 6 and delivers the air to housing 50 enclosing the electronic controls via a duct 57. The fan is surrounded by a cylindrical inlet shroud 58 which surrounds slots 6 and extends as far as duct 57. An opening at the rear end of duct 57 permits air to enter the rear portion of the space and to escape through slots 5. The operation of the fan impeller 52 exudes the air through these slots 5.

As illustrated in FIG. 3, the right-hand compartment 25' between the respective side walls 24' and 12' of housing and heating chamber is ventilated by an air draft through inlet openings 61 in the bottom portion of side wall 24' and outlet openings 62 at the top. The relatively cool air entering openings 61 is heated as it comes into contact with side wall 12' and flows upwardly toward openings 62 due to subatmospheric pressure created by the heating of the cooler air. The space further contains a bearing indicated generally as 63 in FIG. 3 for rotatably supporting a spit 64 to be positioned across the heating chamber, as illustrated in FIG. 6 of the accompanying drawings.

Figure 7:
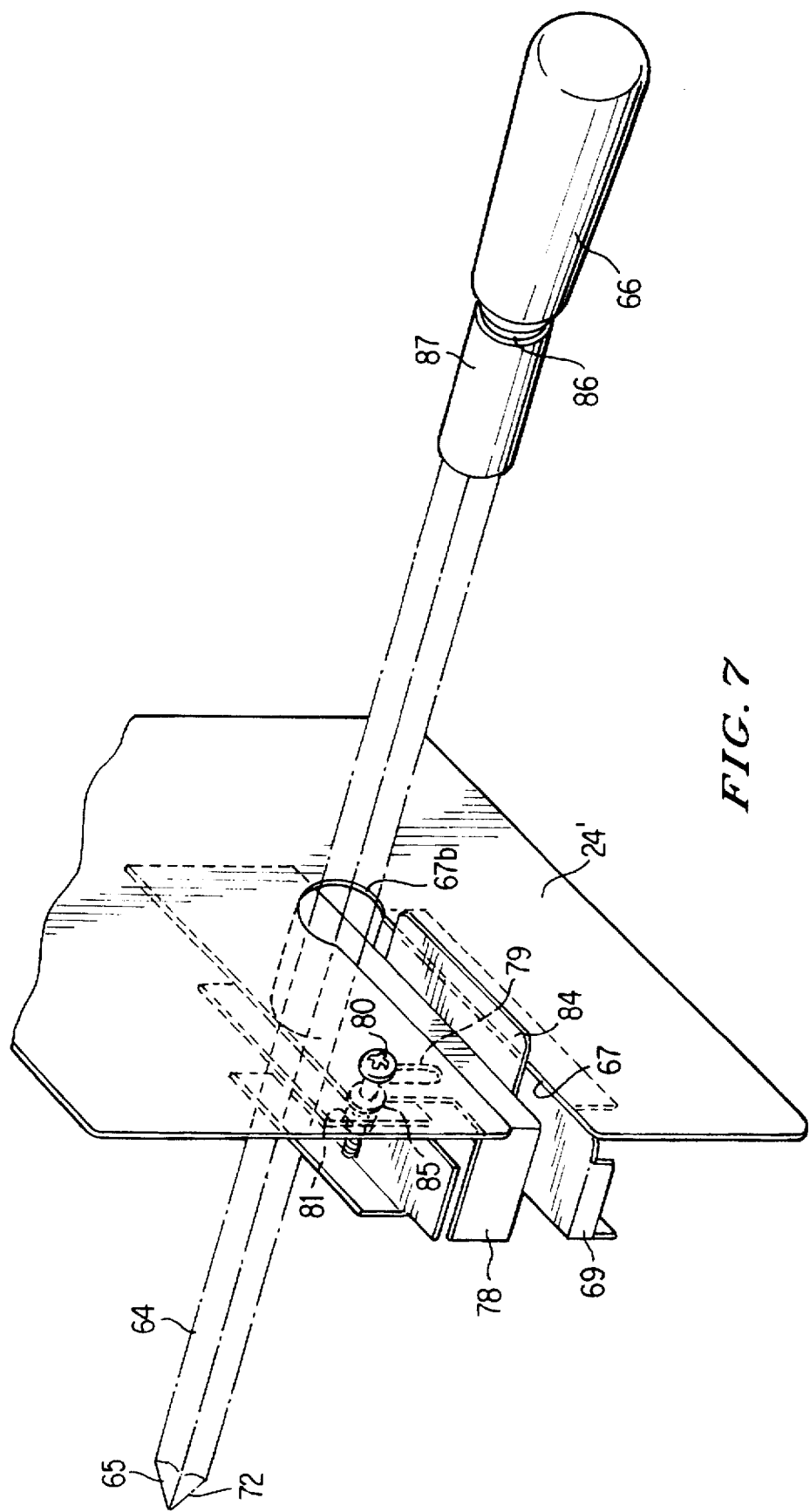
FIG. 7 is a partial, isometric view of the side of the appliance illustrating its use with a spit.
Figure 8:
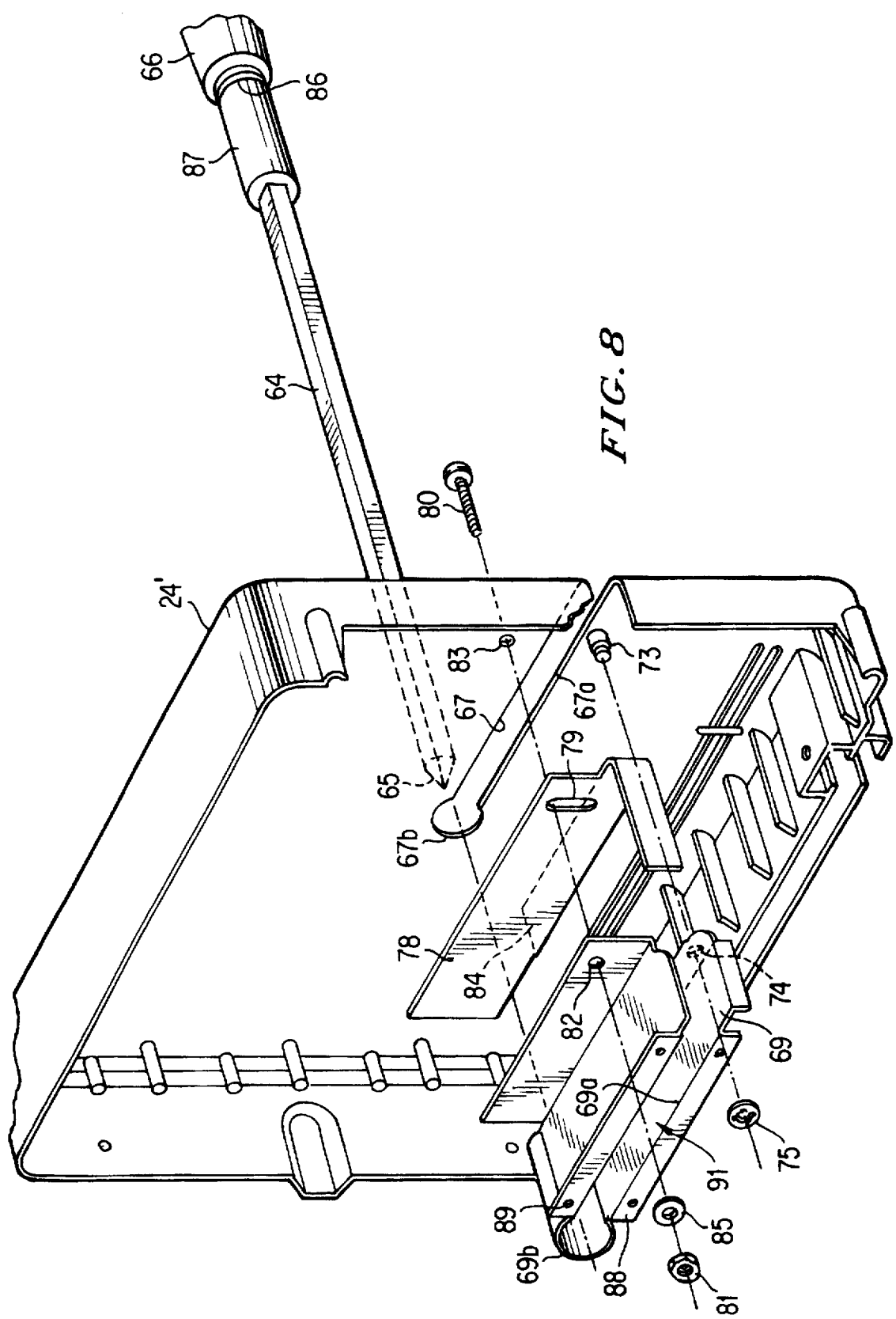
FIG. 8 is an exploded, isometric view of the side of the appliance which accommodates a spit.
Figure 9:
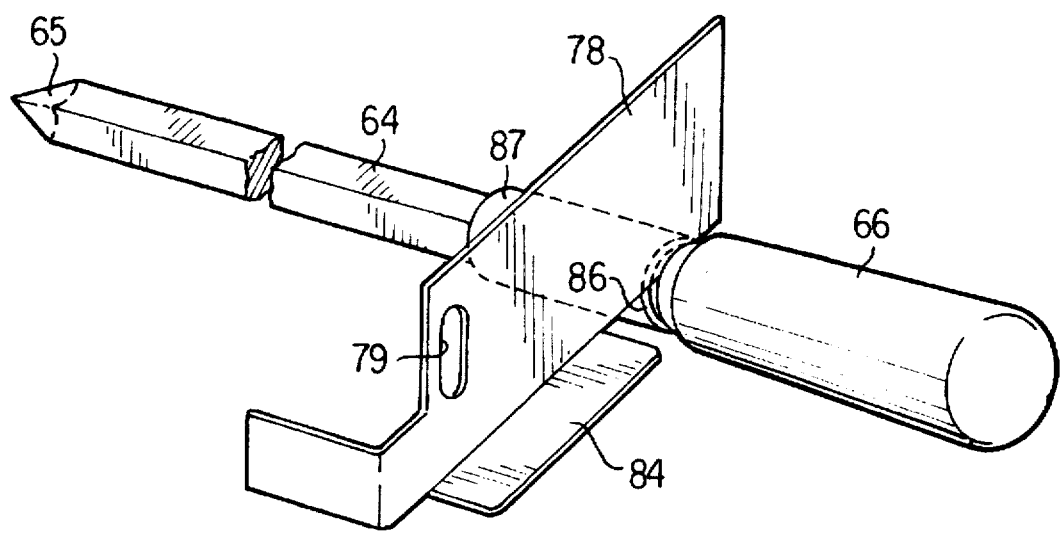
FIG. 9 is an isometric view of a cover or lid used with the side of the appliance which accommodates a spit.

With reference to FIGS. 7, 8 and 9, the bearing 63 (FIG. 3) is configured in accordance with one embodiment of the present invention by providing the side walls 24' and 12' with coincident apertures 67 (FIG. 8) and 68 (FIG. 2), respectively. The aperture 67 will be described in further detail for illustrative purposes. The apertures 67 and 68 are essentially identical in shape and size. The aperture 67 is preferably formed as a slot in the side wall 24' which comprises a first, generally elongated portion 67a that is rectangular in shape and extends horizontally from the front door 1 toward the rear wall 23. The aperture also has a second, rounded or generally circular portion 67b which is at that end of the aperture that is furthest from the front door 1. The rounded end of each aperture 67 and 68 has a diameter that is large enough to accommodate the circumference of the spit, and is preferably larger than the width of the rectangular portion of the aperture. This prevents lateral movement of the spit during rotisserie roasting.

In addition to the apertures 67 and 68, the bearing 63 is configured with a generally U-shaped, integral supporting member 69 (FIG. 8) which is secured to the side wall 24' by conventional means, e.g., at least one integrally formed post 73 on the side wall 24' that protrudes through a corresponding aperture 74 in the supporting member and is secured therein by a pressure washer 75. The supporting member 69 extends across the compartment 25' and abuts the side wall 12' with flanges 88. A bolt (not shown) can be placed through an aperture 89 in the flange and through a corresponding aperture (not shown) in the side wall 12', before being retained therein by a nut (not shown) to secure the supporting member to the side wall 12'. The secured, U-shaped supporting member preferably follows the contours of and is, therefore, coincident with the apertures 67 and 68, as shown in FIG. 8, to form a cavity 91 whose cross-sectional area is essentially the same shape and size as the apertures 67 and 68. The supporting member 69 is preferably formed from a metal material which can withstand heat.

When the convection oven of the present invention is used for rotisserie roasting, the end 65 of the spit 64 is first inserted into the aperture 67. The spit is guided toward the aperture 68 by the supporting member 69, the inner surface of the rounded portion 69b of which creates a bearing surface. Once the end 65 of the spit is in the heating chamber, the spit can be used to skewer foodstuff 77. The end 65 of the spit is subsequently placed in the slot 70 of the shaft 56.

With continued reference to FIGS. 7, 8 and 9, the loss of hot air from the heating chamber to the outside of the oven via cavity 91 is substantially reduced by a cover member 78. The cover member comprises an elongated slot 79. The cover member is preferably secured between the supporting member 69 and the side wall 24' by inserting a bolt 80 through the slot 79 and corresponding apertures 82 and 83 in the supporting member and the side wall, respectively, and by securing the bolt therein using a nut 81 and a washer 85. When the spit is not being used, the cover member can be in a closed position, that is, can cover the cavity 91. When the spit is in use, the cover member can be raised vertically by a user by gripping a lip 84. The movement of the bolt 80 along the slot 79 guides the raising and lowering of the cover member. The cover member is raised to expose the rounded portion of the supporting member 69b, and the spit is inserted therein. Once the foodstuff is skewered, and the spit is placed in the slot 70 of the shaft 56, the cover member can be lowered again. The spit is preferably provided with a groove 86 (FIG. 9) adjacent the handle thereof, and a tubular section 87. The tubular section 87 preferably abuts the rounded portion 69b of the supporting member when the spit is in use. The outer circumference of the tubular section is preferably slightly less than the inner circumference of the rounded portion 69b of the supporting member. The bottom edge of the cover member can be lowered and made to rest within the groove 86, as shown in FIG. 9, and the bolt 80, and the nut 81 and washer 85 tightened without creating too much friction against the spit. The spit therefore can rotate about its longitudinal axis. The lateral movement of the spit, however, is reduced because the rectangular portion 69a (FIG. 8) of the supporting member and of the apertures 67 and 68 are more narrow than their corresponding rounded portions.

Figure 10:
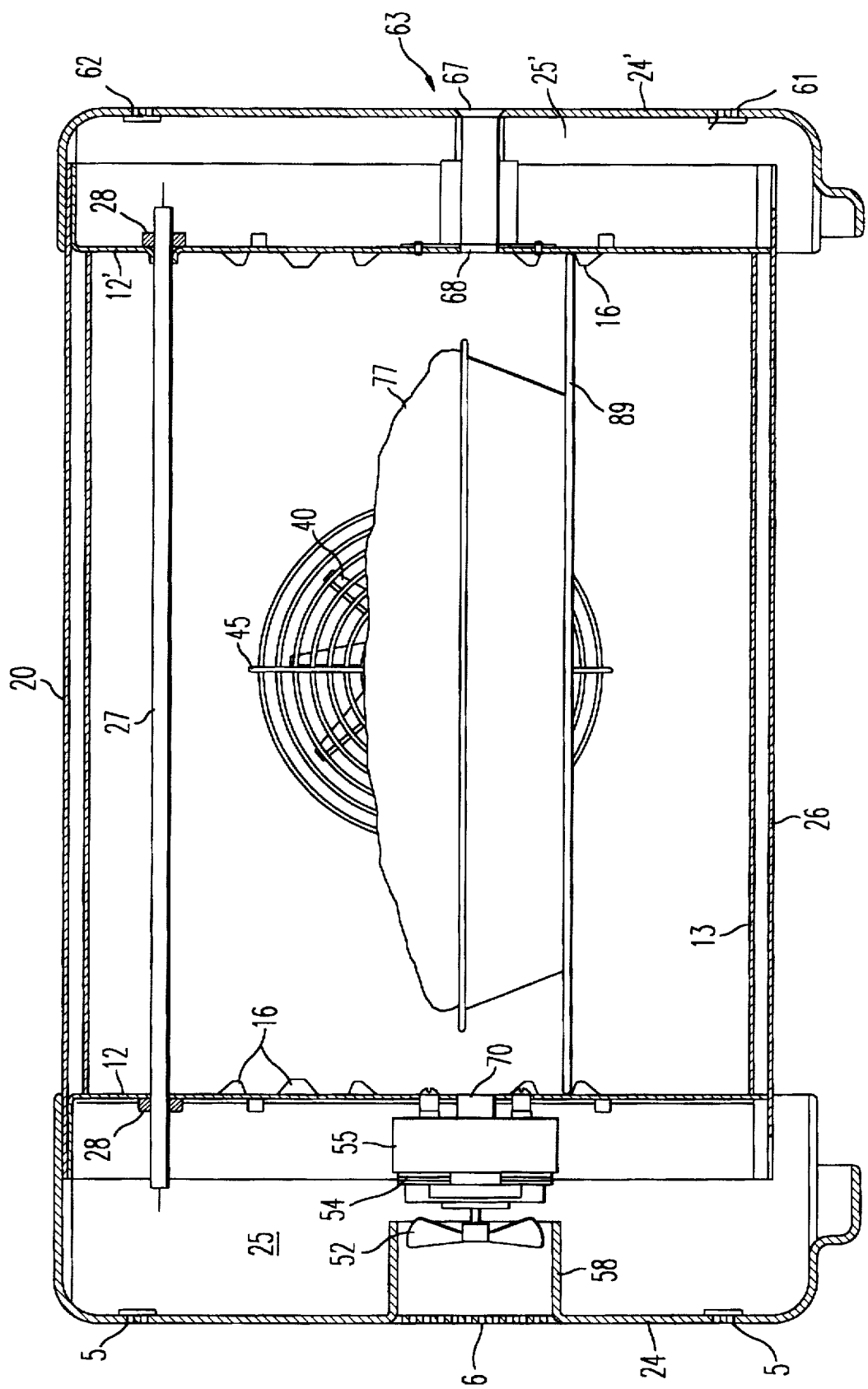
FIG. 10 is a cross sectional view of the appliance taken along line 3—3 of FIG. 2, showing a cake being baked.
Figure 11:
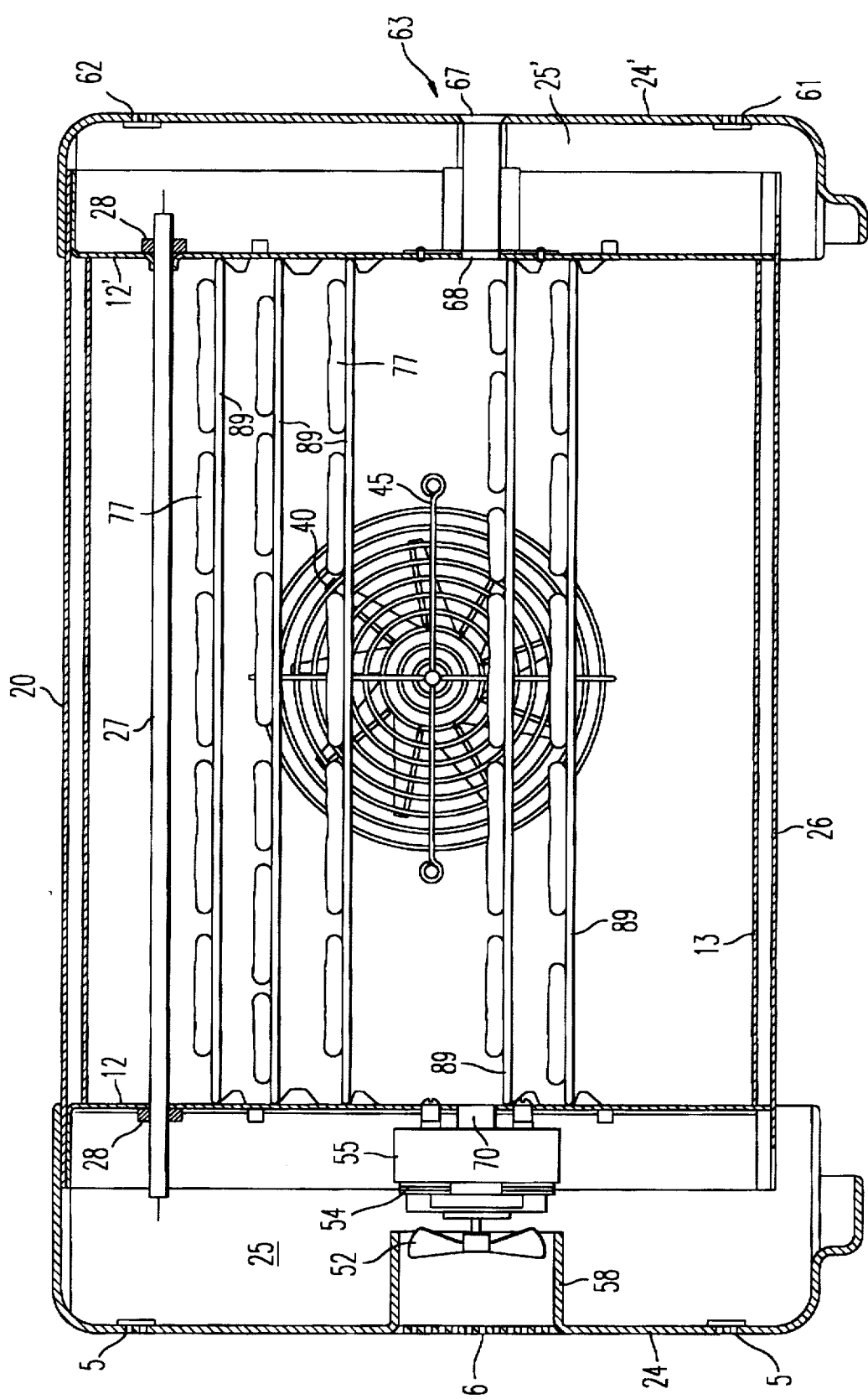
FIG. 11 is a cross sectional view of the appliance taken along line 3—3 of FIG. 2, showing dehydration of food placed on five superpose trays.

FIGS. 10 and 11 are provided to illustrate the use of the oven of the present invention in preparing different types of foodstuff. For example, as shown in FIG. 10, the oven can be configured with a single shelf 89 suspended horizontally between two ridges 16 to bake a cake. Alternatively, several shelves 89 can be suspended horizontally between respective pairs of ridges 16 to bake, for example, several sheets of cookies.

Figure 12:
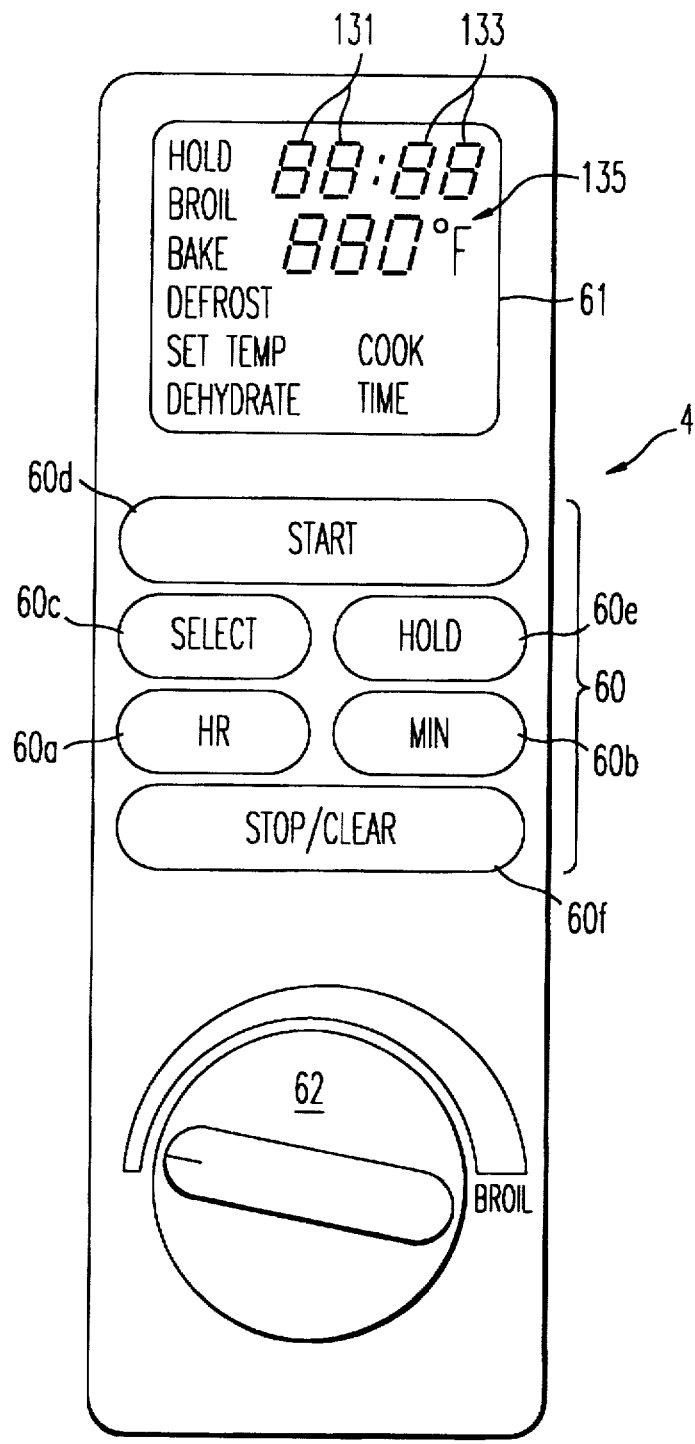
FIG. 12 is an elevational view of the control panel in front of the appliance.

The control panel 4 illustrated in FIG. 12 contains six press buttons 60 which correspond to different instructions transmitted to a processor associated with the electronic controls inside compartment 25. The processor can be any suitable means known in the art but is preferably a microcomputer. The top of the panel 4 includes a display screen 61 which shows the different modes of heating, the time selected and temperature. The panel bottom includes a temperature dial 62 which is set to the desired temperature by turning it.

Figure 13:
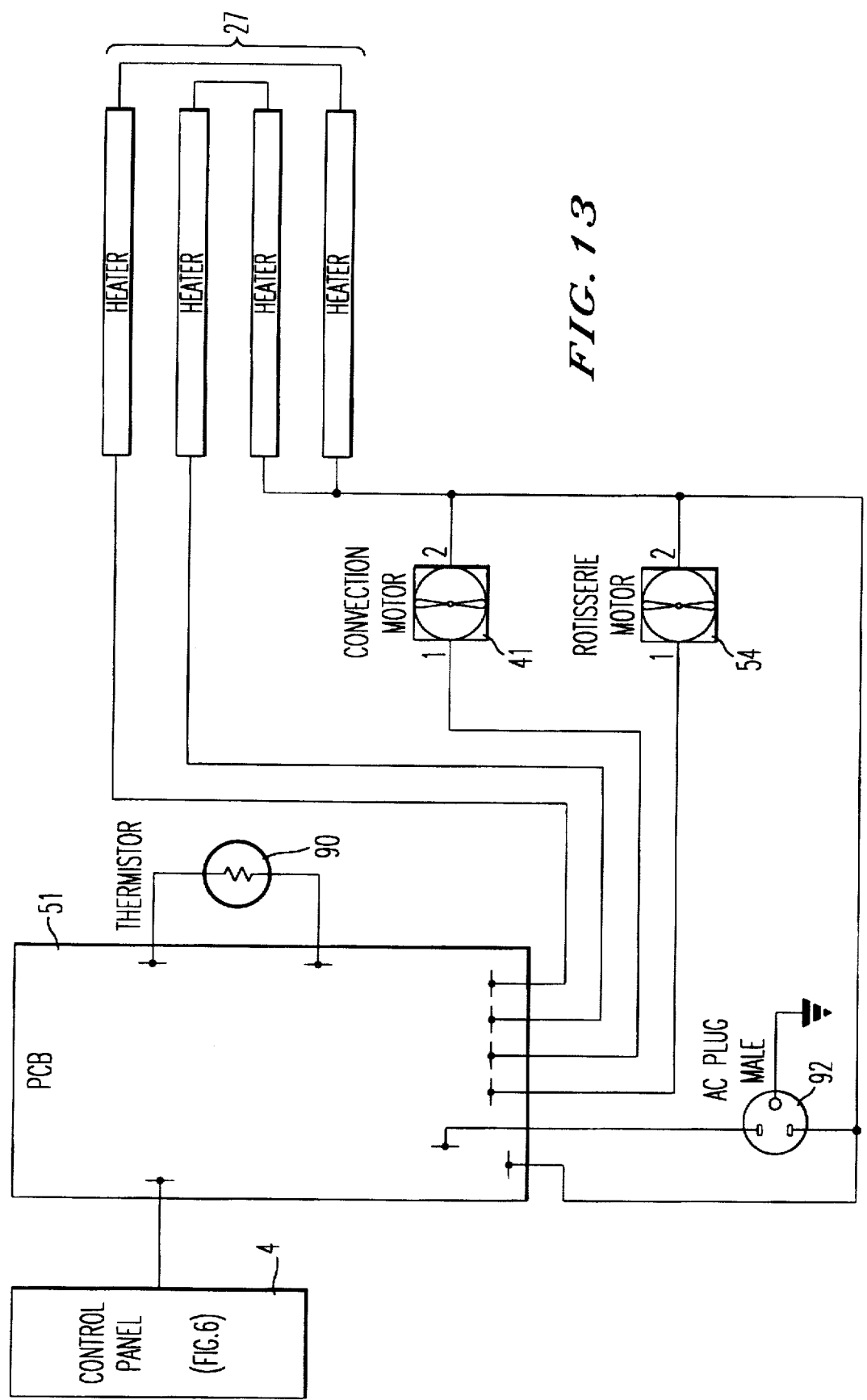
FIG. 13 is a schematic block diagram of electronic control means for controlling the operation of the combination cooking appliance according to the invention.

FIG. 13 depicts the electronic control means, which is preferably a printed circuit board (PCB) 51. The PCB 51 is connected to the four heater elements 27, the convection motor 41, the rotisserie motor 54, a temperature sensor in the oven (e.g., a thermistor) 90, and the control panel 4 in a conventional manner. The PCB is provided with power from an AC power supply (not shown) via an AC plug 92.

Figure 14:
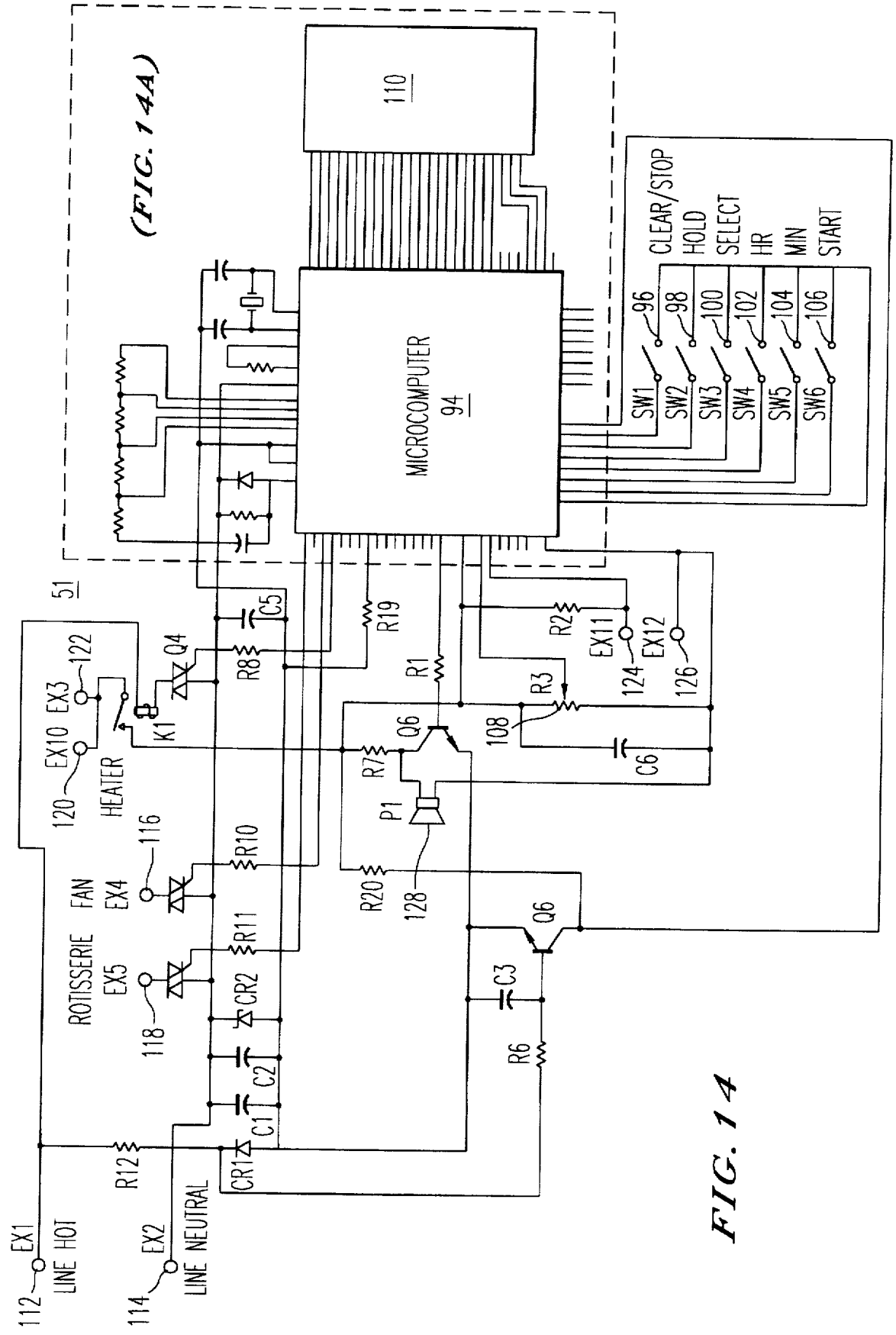
FIGS. 14 and 14A are a schematic diagram of the printed circuit board of the electronic control means.
Figure 14A:
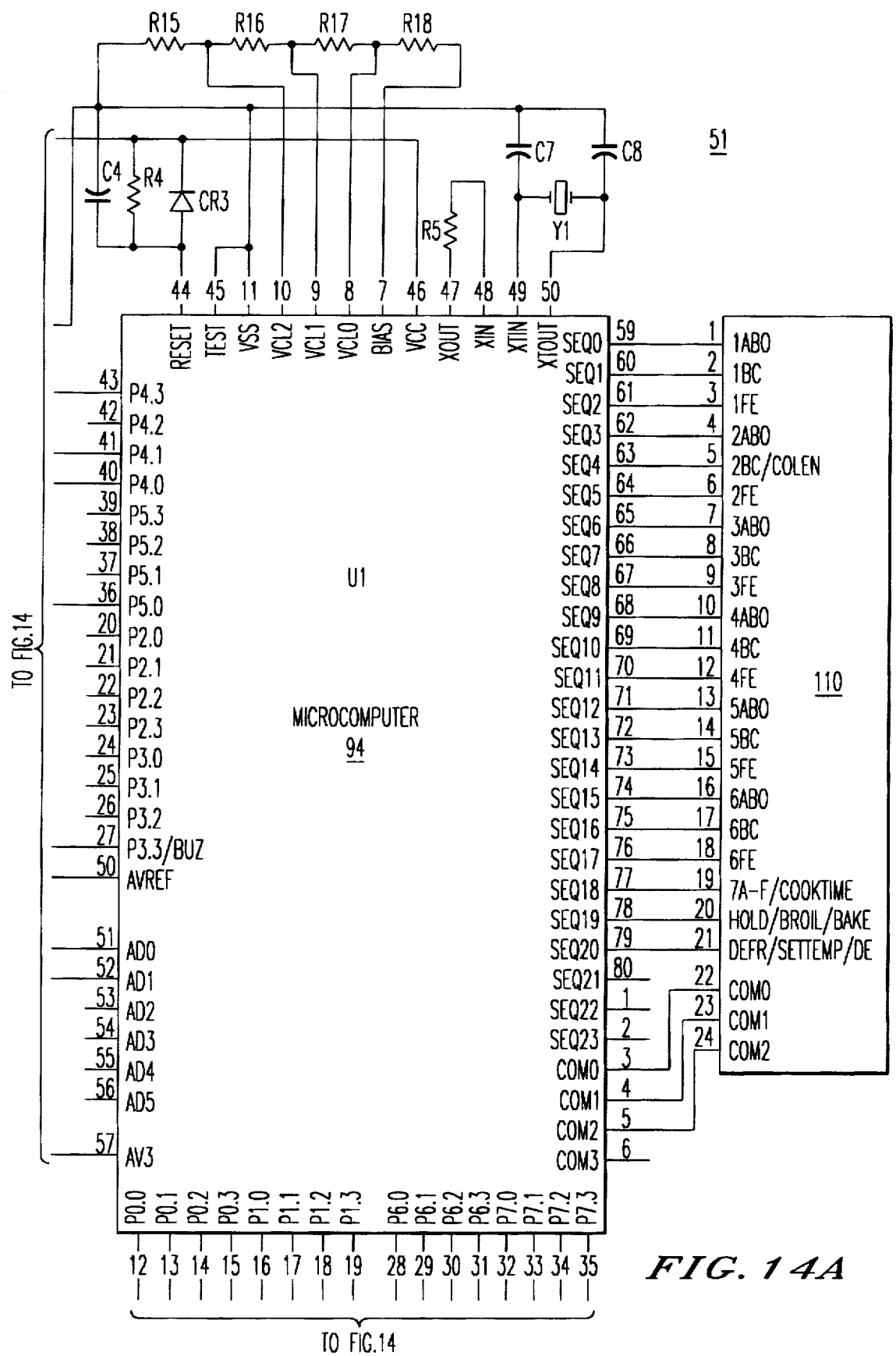

With reference to FIGS. 14 and 14A, the PCB 51 comprises a conventional microcomputer 94. The PCB 51 further comprises six switches 96, 98, 100, 102, 104 and 106 connected to the control panel buttons 60 labeled in FIG. 12 as START, SELECT, HOLD, HR, MIN, and STOP/CLEAR. When one of these buttons is depressed, the corresponding switch closes and provides an input signal to the microcomputer 94. The microcomputer is programmed to perform various operations, depending on which key is depressed and how many times the key is depressed, as will be described below. Inputs from the temperature dial 62 are preferably provided to the microcomputer 94 by a potentiometer 108.

With continued reference to FIGS. 14 and 14A, an liquid crystal display (LCD) interface circuit 110 is provided at the outputs of the microcomputer. The microcomputer sends output signals to the LCD interface circuit 110 to generate appropriate characters on the display 61 under programmed control. The PCB 51 also comprises inputs 112 and 114 for AC power, inputs 116 and 118 for the motors 41 and 54, respectively, inputs 120 and 122 for the heating elements 27, and inputs 124 and 126 for the temperature sensor 90. The microcomputer 94 can also drive a loudspeaker 128 to generate tones such as an audible alarm to indicate when the time entered for a cooking process has expired.

The operation of the convection oven of the present will now be described in conjunction with the flow charts in FIGS. 15A–C and 16. With reference to blocks 132 and 134 in FIGS. 15A–C, the microcomputer is programmed to intermittently flash two integer numerals, indicated collectively as 131 in FIG. 12, which represent the hour of the day, once the convection oven of the present invention is plugged into a power source. The user can set the hour of the day by depressing the HR button 60a on the panel 4. The microcomputer increases the integer value representing the hour displayed on the panel by one each time the HR button is depressed until a desired numeral between 1 and 12 is indicated on the display 61. With reference to block 138, the user sets the minutes indicated as 133 in FIG. 12 by repeatedly depressing the MIN button 60b on the panel 4 until the desired numeral within the range of 1 and 60 is indicated on the display 61. The microcomputer accepts these hour and minute settings, as indicated in blocks 136 and 140, as initial values to operate a programmed clock. As shown in blocks 142, 144 and 146, the display 61 indicates the time of day at all times when the convection oven is connected to an uninterrupted power source until a cooking mode is selected, as will be described in further detail below.

When the user wishes to process a foodstuff 77 using the convection oven of the present invention, the user depresses the SELECT button 60c (block 148) which causes the microcomputer to scroll through each of preferably four different cooking modes, that is, broil, bake, defrost and dehydrate, each time the SELECT button is depressed. The words BROIL, BAKE, DEFROST and DEHYDRATE are generated on the left side of the display under program control of the microcomputer 94. The cooking mode which corresponds to the most recent depressing of the SELECT button is caused to intermittently flash by the microcomputer, as indicated by blocks 150, 156, 160 and 164. With reference to blocks 152, 154, 158, 162 and 166, once the user sees the desired cooking mode flashing on the display 61, the user can enter the desired cooking temperature and/or total length of cooking time as will be described in further detail in connection with the flow chart in FIG. 16. Once this information is entered, the user depresses the START button 60d to begin cooking to begin cooking.

Figure 16:
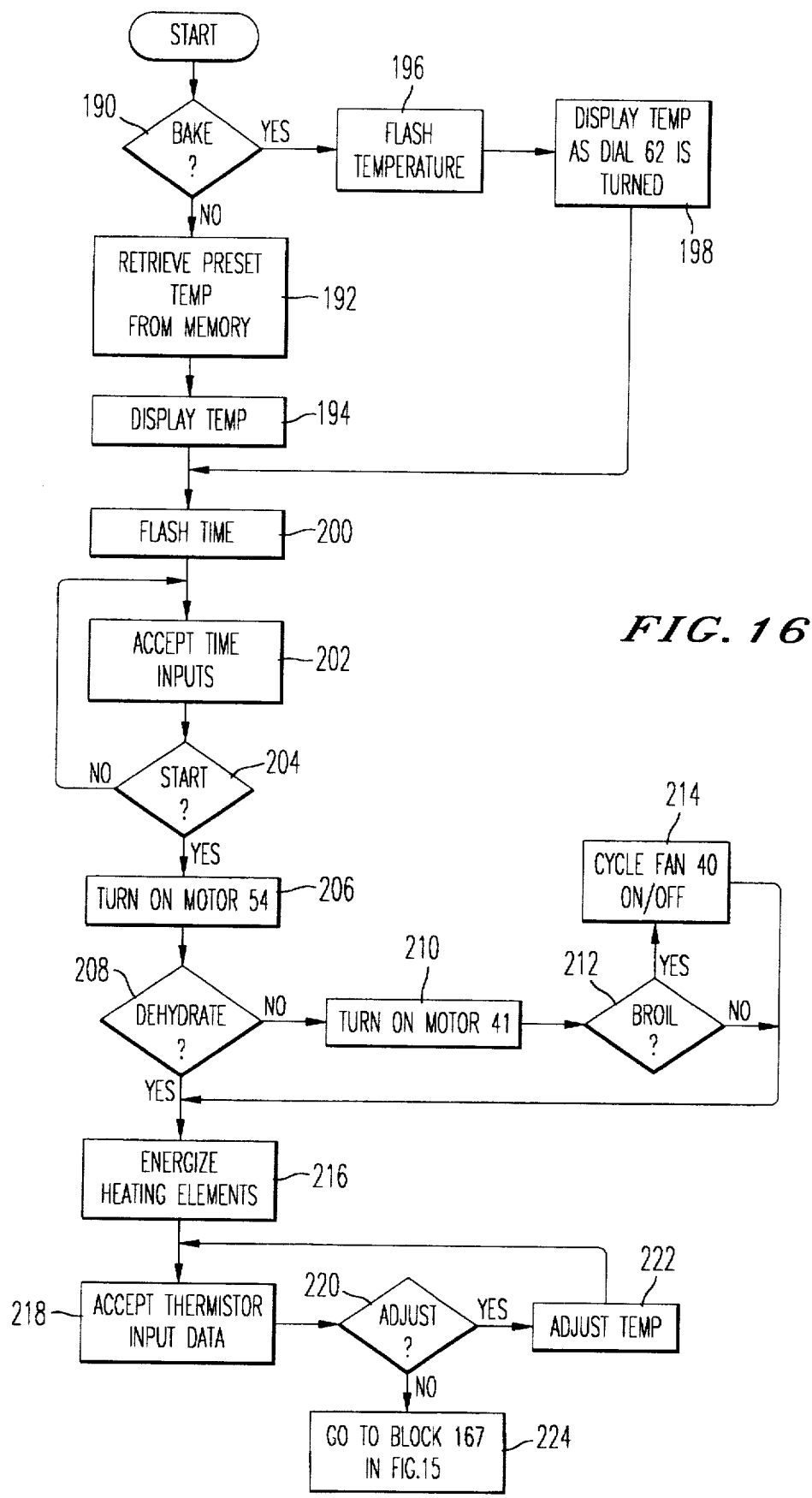

The convection oven will operate in accordance with the flow chart depicted in FIG. 16 until one of a number of conditions occurs. For example, the user can depress the HOLD button 60e during the cooking time, as indicated by the decision block 167. This will cause the microcomputer to freeze the current display showing the selected cooking mode, the current temperature of the oven and the remaining cooking time, as shown in block 168.

With reference to the affirmative branch of decision block 169 and block 170, the user has the option of changing the cooking time by depressing the HR or MIN buttons 60a and 60b or, if in the BAKE cooking mode, changing the desired cooking temperature by turning the dial 62. Thus, the HOLD button is useful to allow the user to interrupt the cooking cycle and to freeze the oven temperature in its current state in order to, for example, check the food, baste the food, and make any necessary adjustments to the cooking temperature and/or time. Alternatively, the user can depress the HOLD button 60e simply to suspend the operation of the convection oven in its current cooking mode, that is, to maintain the current oven temperature while stopping the cooking time clock being generated in accordance with program control of the microcomputer. With reference to decision blocks 172 and 174, the microcomputer is programmed to resume the current cooking mode in accordance with the cooking time selected by the user and the cooking temperature, which is selected either by the user or predetermined under program code as will be described below, if a predetermined interval of time (e.g., one minute) has expired or the user has depressed the START button 60d.

With reference to decision block 176, the microcomputer is programmed to terminate the current cooking cycle and cause the display 61 to display the time of day in lieu of the remaining cooking time if the STOP/CLR button 60f is depressed. As indicated by the affirmative branch of decision block 178 and block 179, the convection oven continues to operate in accordance with user and/or programmed input until the cooking time expires if the stop/clear button 60f is not depressed.

With continued reference to block 154 in FIG. 15A, the four cooking modes will now be described in conjunction with the flow chart depicted in FIG. 16. As indicated by decision block 190, the microcomputer causes a temperature indicator 135 on the display 61 to intermittently flash if the BAKE mode is selected. The user selects the desired temperature for the BAKE mode by rotating the dial 62. Dial 62 is electronically connected to the potentiometer 108. The potentiometer 108 provides an input to the microcomputer to enable the microcomputer to indicate the selected cooking temperature on the display 61 in, for example, increments of 10 degrees corresponding to the extent to which the dial 62 has been rotated, as indicated in blocks 196 and 198. In the remaining cooking modes, that is, BROIL, DEFROST and DEHYDRATE, the oven temperature is predetermined in accordance with stored programmed code. The temperature, i.e., 485° F., 160° F. and 140° F., respectively is indicated on the display 61, depending upon which of the BROIL, DEFROST or DEHYDRATE modes is selected.

Figure 15A:
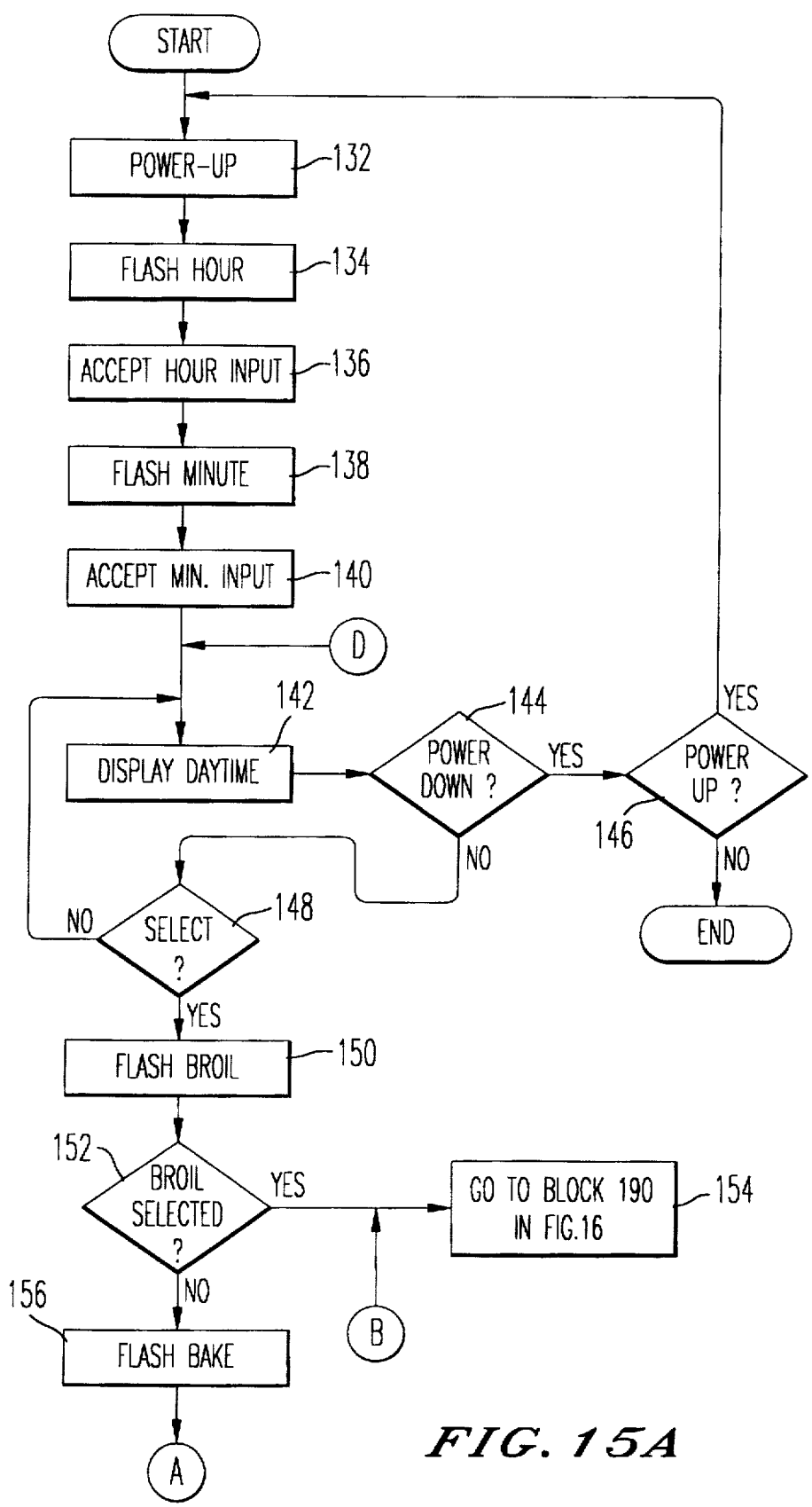
FIGS. 15A, 15B, 15C, and 16 are flow charts depicting a sequence of operations carried out by the combination cooking appliance according to the invention.
Figure 15B:
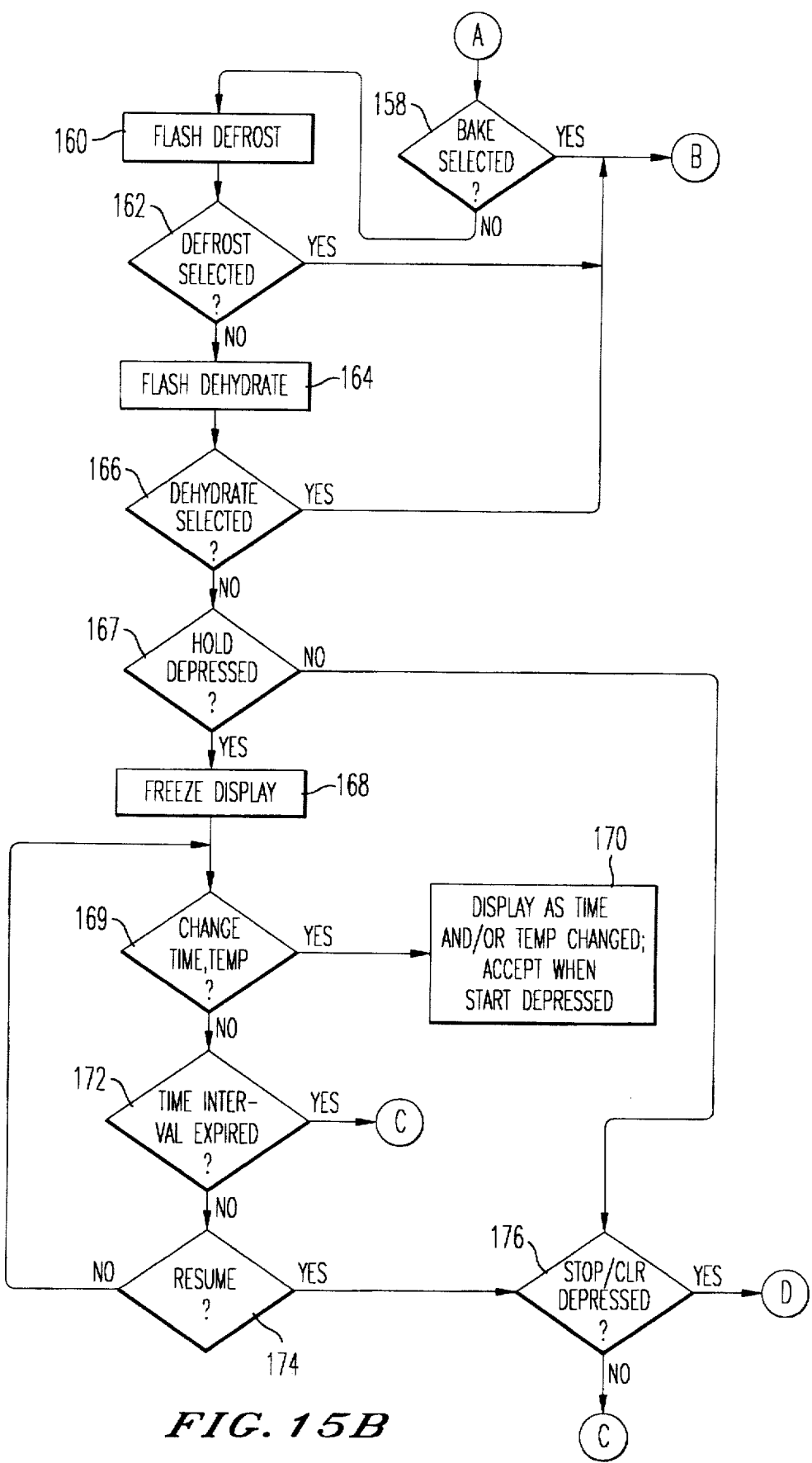

With reference to blocks 200 and 202, the user can repeatedly depress the HR and the MIN buttons to enter the desired cooking time in the same manner as entering the time of day following power-up (blocks 134 and 138 in FIG. 15A).

With reference to blocks 204 and 206, after the user has selected the desired cooking mode, cooking time and, if necessary, cooking temperature, the user depresses the START button 60d. The microcomputer in turn energizes the motor 54 and therefore begins the rotation of the fan 52 for cooling the electronics on the PCP board 51. The shaft 56 preferably begins to rotate. Thus, if a foodstuff has been skewered on a spit and the spit installed as described above, the rotisserie roasting process begins.

With reference to blocks 208 and 210, the microcomputer also energizes the motor 41 and therefore the rotation of the impellers 32 and 40 unless the DEHYDRATE cooking mode has been selected. The rear fan 40 is preferably not used during the DEHYDRATE cooking mode because low heated air velocity is desired.

With reference to blocks 212 and 214, the microcomputer causes the impeller 40 to operate cyclically during the BROIL cooking mode, that is, causes the fan to be turned on and therefore rotate for a predetermined period of time (e.g., 5 minutes), and then be turned off for a period of time before rotating again. The intermittent operation of the fan during the BROIL mode is advantageous for searing the foodstuff with direct heat without burning it.

With reference to block 216 in FIG. 16, the microcomputer causes the heater elements 27 to be energized in order to achieve the default or selected temperature which is detected by the thermistor 90. With reference to blocks 218, 220 and 222, the microcomputer is programmed to intermittently adjust the amount of current that is supplied to the heater elements from the AC power source to maintain the selected or default cooking temperature.

As stated previously, the microcomputer operates the fans 42 and 52 to cool the printed circuit board 51, the rotisserie motor 54 and the convection motor 41. The microcomputer also controls the engagement and disengagement of the fan 41 and the energization of the heating elements 27 in accordance with the selected cooking mode. With reference to block 224, the operation of these components of a convection oven continues in this manner until the HOLD button is depressed, or the STOP/CLEAR button is depressed or the selected cooking time has expired as indicated by decision blocks 167, 176 and 178, respectively, in FIGS. 15A and 15B.

Figure 15C:
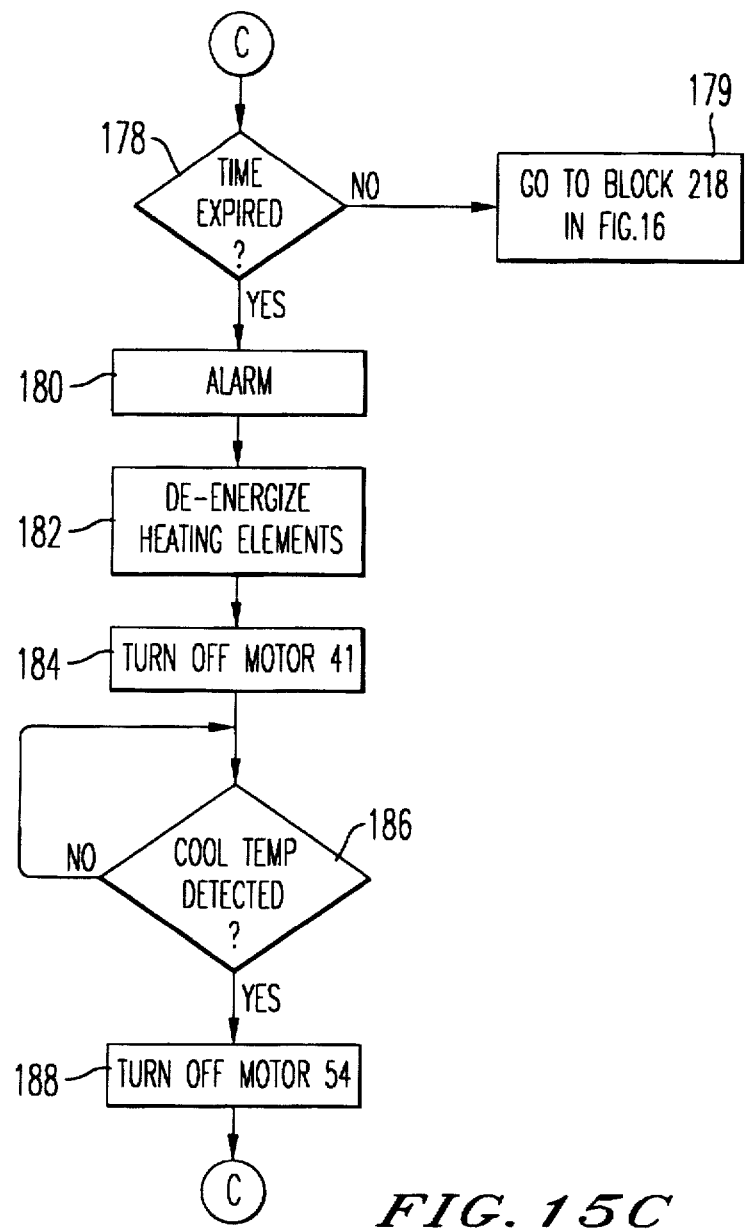

Once the selected cooking time has expired, the microcomputer operates the loud speaker 128 to generate an audible alarm to indicate the end of a cooking cycle, as indicated by block 180 in FIG. 15C. With reference to blocks 182 and 184, the microcomputer also de-energizes the rear fan 41, if it was in use, and discontinues the supply of current to the heating elements 27. With reference to blocks 186 and 188, the fan 52 for cooling the electronics in compartment 25 is turned off when the internal oven temperature, as sensed by thermistor 90, falls below a predetermined temperature (e.g., 250° F.). The fan 52 therefore continues to operate to exude hot air from the compartment 25 until the internal oven temperature falls below a temperature that no longer poses a thermodynamic threat to the electronics therein. Finally, the microcomputer resumes the display of the time of day as indicated in block 142.

It is to be understood that the present invention is not limited to the operation described above in connection with the flow charts in FIGS. 15A–C and 16. For example, the microcomputer can be programmed to accept oven temperature settings in other cooking modes besides baking and to vary the temperature. Further, it can be programmed to vary fan speed as between different cooking modes or within the same cooking mode. The microcomputer can be pre-programmed to run the fan or not at all as, for example, during dehydrating when a lower air velocity is desired. In another example, a cake can be baked by programming the microcomputer to set temperature, to gradually cut back the power of the heater to prevent over shooting of the temperature, and subsequently to cycle the heater on and off once the set temperature has been reached.

The oven of the present invention, when used for rotisserie cooking, provides heated air which constantly circulates around the rotisserie all the time that the rotisserie is turning. This results in more evenly cooked and uniformed browned poultry and roasts.

The oven of the present invention also comprises a fan inside the oven which is centered on the rear portion of a heating chamber that is formed with a parabolically reflective shape, that is, an interior formed with radiuses and tolerances that generally differ with respect to each other. The interior can be a unitary sheet of metal or can be several pieces welded together. Thus, the interior is gradually curved over essentially its entire surface in contrast to a conventional oven, the interior of which generally comprises flat surfaces and corners. Together, the fan inside the oven and the parabolically reflective shape of the oven interior circulate heated air throughout the oven more efficiently and more uniformly than conventional ovens.

The oven of the present invention is a counter top convection oven that features a user-friendly touch-pad, and a digital temperature display/time display, which indicates temperature and remaining cooking time at all times during pre-heating and cooking oven temperatures.

The oven of the present invention is configured to keep the electronic controls cool using a fan in the side compartment where the controls are located. The availability of electronic controls with an oven is advantageous because they provide more accurate oven temperature and time settings than conventional ovens that do not employ digital logic controls during the preheating and cooking modes. It is therefore easier to duplicate recipes.

The foregoing detailed description is illustrative of a preferred embodiment of the present invention. It will be appreciated that numerous variations and changes can be made thereto without departing from the scope of the present invention as defined in the accompanying claims.

What is claimed is:

1. An electrically heated convection oven for baking, rotisserie roasting, broiling, defrosting, and dehydrating a foodstuff, comprising:

a heating chamber surrounded by an outer housing, said heating chamber having a top wall, two side walls, a rear wall, and a bottom wall, said housing comprising a rear wall spaced from said rear wall of said chamber to form an air duct, two side walls and a front door configured to be a front wall of said heating chamber;

a second housing attached to the exterior of said rear wall of said housing;

a first electric motor positioned in said second housing comprising a shaft inserted through said rear wall of said heating chamber, said shaft carrying a first radial fan impeller rotatable inside and in front of said rear wall of said heating chamber for moving heated air in said chamber, and a second radial fan impeller on the back of said rear wall for circulating air for cooling said motor inside said second housing;

at least one electric heating element mounted inside said chamber and close to and along its top wall; and a control circuit for operating said first electric motor and said at least one heating element;

wherein at least one of said rear wall, said top wall and said bottom wall of said heating chamber is curved along substantially the entire length thereof to create a parabolically deflective surface for minimizing resistance from the interior of said heating chamber to movement of said heated air by said first radial fan impeller, said deflective surface having an inner concave surface facing said first radial fan impeller for enhancing movement of said heated air, said heating chamber not including a heated element located adjacent to said first radial fan impeller.

2. A convection oven as claimed in claim 1, wherein said rear wall, said top wall and said bottom wall of said heating chamber are configured as a single, integrally formed surface characterized by radiuses and tolerances that define a substantially parabolic shape.

3. A convection oven as claimed in claim 1, further comprising a control panel mounted on the exterior of said housing comprising instruments and a display device for activating said electronic control circuit to select different operations of said oven.

4. A convection oven as claimed in claims 3, wherein said electronic control circuit comprises a programmable microcomputer programmed to follow a user's instructions relating to at least one of different modes of heating of food placed into said oven as selected by means of said control panel.

5. A convection oven as claimed in claim 4, wherein a temperature sensor is provided in said chamber and configured to transmit signals indicating the temperature inside said chamber to said microcomputer, and said microcomputer being programmed to adjust the temperature by controlling said at least one heating element.

6. A convection oven as claimed in claim 1, wherein said at least one heating element is a resistive rod extending along the longitudinal axis of said chamber and mounted in insulating members in said side walls of said chamber.

7. A convection oven as claimed in claim 1, wherein said side walls of said chamber are each provided with at least one inwardly projecting member for supporting a shelf member substantially horizontally therebetween.

8. A convection oven as claimed in claim 1, wherein a removable screen is detachably mounted to said rear wall in front of said first radial impeller in said chamber.

9. A convection oven as claimed in claim 1, wherein said first electric motor is speed-controllable inside said heating chamber in accordance with different modes of heating food.

10. A convection oven as claimed in claim 1, wherein said control circuit comprises a programmable logic device for controlling said first motor and said heating element in accordance with a plurality of different cooking modes.

11. The oven as defined in claim 1, wherein said hinged door closing the oven front contains a glass panel and a handle.

12. The oven as defined in claim 1, wherein said rear wall of said second housing is provided with air openings for drawing air outside said second housing for ventilation thereof and cooling of said first electric motor.

13. An electrically heated convection oven for baking, rotisserie roasting, broiling, defrosting, and dehydrating a foodstuff, comprising:

a heating chamber surrounded by an outer housing, said heating chamber having a top wall, two side walls, a rear wall, and a bottom wall, said housing comprising a rear wall spaced from said rear wall of said chamber to form an air duct, two side walls and a front door configured to be a front wall of said heating chamber, at least one of said side walls of said housing and said corresponding side wall of said chamber being spaced apart and configured to form a lateral compartment;

a second housing attached to the exterior of said rear wall of said housing;

a first electric motor positioned in said second housing comprising a shaft inserted through said rear wall of said heating chamber, said shaft carrying a first radial fan impeller rotatable inside and in front of said rear wall of said heating chamber for moving heated air in said chamber, and a second radial fan impeller on the back of said rear wall for circulating air for cooling said motor inside said second housing;

at least one electric heating element mounted inside said chamber and close to and along its top wall;

an electronic control circuit positioned in said lateral compartment for operating said first electric motor and said at least one heating element; and a second electric motor positioned inside said lateral compartment, said motor having a high speed shaft inside said compartment carrying a third radial fan impeller for moving air to cool said electronic control circuit, and a reduction gear and a low speed shaft attached thereto which extends through said side wall of said chamber, said low speed shaft being configured for engagement with one end of a horizontal rotisserie spit to rotate said spit inside said chamber.

14. A convection oven as claimed in claim 13, further comprising a bearing attached to said side wall of said chamber that is opposite said side wall containing said low speed shaft, said bearing being adapted to carry the other end of said rotisserie spit.

15. A convection oven as claimed in claim 14, wherein said side wall attached to said bearing is spaced apart from the adjacent said side wall of said housing to form a second lateral compartment, said side wall of said housing and said side wall of said chamber each being configured with an aperture for receiving said spit therethrough, said bearing comprising a supporting member secured between said side walls to support and guide at least that portion of said spit extending through said second lateral compartment and through said apertures.

16. A convention oven as claimed in claim 15, wherein said apertures are generally elongated and extend from said front door toward said rear wall of said chamber and said housing, respectively, the end of each of said apertures in closest proximity to said rear wall being adapted to receive a tubular, concentric member secure to said spit and the remainder of said apertures being too narrow to accommodate the diameter of said tubular member.

17. A convection oven as claimed in claim 16, further comprising a movable door slidably secured to at least one of said side walls and adapted to reduce the flow of heated air from inside said chamber when said oven is operational to the exterior of said housing via said apertures.

18. An electrically heated convection oven for baking, rotisserie roasting, broiling, defrosting, and dehydrating a foodstuff, comprising:

a heating chamber surrounded by an outer housing, said heating chamber having a top wall, two side walls, a rear wall, and a bottom wall, said housing comprising a rear wall spaced from said rear wall of said chamber to form an air duct, two side walls and a front door configured to be a front wall of said heating chamber, at least one of said side walls of said housing and said corresponding side wall of said chamber being spaced apart and configured to form a lateral compartment;

a second housing attached to the exterior of said rear wall of said housing;

a first electric motor positioned in said second housing comprising a shaft inserted through said rear wall of said heating chamber, said shaft carrying a first radial fan impeller rotatable inside and in front of said rear wall of said heating chamber for moving heated air in said chamber, and a second radial fan impeller on the back of said rear wall for circulating air for cooling said motor inside said second housing;

at least one electric heating element mounted inside said chamber and close to and along its top wall;

an electronic control circuit positioned in said lateral compartment for operating said first electric motor and said at least one heating element; and a second electric motor positioned inside said lateral compartment, said motor having a high speed shaft inside said compartment carrying a third radial fan impeller for moving air to cool said electronic control circuit, wherein said first lateral compartment comprises a shroud for enclosing said electronic control circuit and separating said electronic control circuit from the remaining portion of said lateral compartment comprising said third radial fan impeller, said housing comprising an aperture through which air from outside said housing enters said shroud, said shroud having an aperture for exuding the air into said remaining portion of said lateral compartment.

19. A convection oven as claimed in claim 18, wherein side wall of said housing corresponding to said first lateral compartment comprises at least one inlet aperture and at least one outlet aperture, said inlet aperture being operable to draw air from outside said housing toward said third radial fan impeller, said outlet aperture being operable to exude air from inside said lateral compartment to the outside of said housing.

20. A convection oven as claimed in claim 18, wherein side wall of said housing corresponding to said first lateral compartment comprises a plurality of elongated, substantially horizontally extending inlet slots, said inlet slots being arranged on said side wall so as to be in close proximity to said third radial fan impeller and being operable to draw air from outside said housing toward said third radial fan impeller.

21. A convection oven as claimed in claim 18, wherein side wall of said housing corresponding to said first lateral compartment comprises a plurality of elongated, substantially horizontally extending outlet slots, said outlet aperture being arranged at the top and bottom of said side wall operable to exude air from inside said lateral compartment and moved by said third radial fan impeller to the outside of said housing.

22. A convection oven as claimed in claim 18, wherein said electronic control circuit comprises a printed circuit board mounted in said shroud.

23. A convection oven as claimed in claim 18, wherein said housing comprises apertures and a molded, cylindrical member extending toward said third radial fan impeller through which air from outside said housing enters said apertures, said cylindrical member directing said air toward said third radial fan impeller.

* * * * *